(12) United States Patent
Seo et al.

(10) Patent No.: US 9,419,923 B2
(45) Date of Patent: Aug. 16, 2016

(54) METHOD FOR SHARING FUNCTION BETWEEN TERMINALS AND TERMINAL THEREOF

(71) Applicant: LG Uplus Corp., Seoul (KR)

(72) Inventors: Byung Soo Seo, Gyeonggi-do (KR); Youn Jei Han, Gyeonggi-do (KR); Jeong Yun Moon, Seoul (KR); Han Koo Jung, Seoul (KR); Pan Keun Kwon, Incheon (KR)

(73) Assignee: LG UPLUS CORP., Seoul (KR)

( * ) Notice: Subject to any disclaimer, the term of this patent is extended or adjusted under 35 U.S.C. 154(b) by 65 days.

(21) Appl. No.: 14/193,859

(22) Filed: Feb. 28, 2014

(65) Prior Publication Data

US 2014/0240440 A1   Aug. 28, 2014

(30) Foreign Application Priority Data

| Feb. 28, 2013 | (KR) | 10-2013-0022491 |
| Jul. 15, 2013 | (KR) | 10-2013-0082885 |
| Jul. 16, 2013 | (KR) | 10-2013-0083490 |
| Jul. 16, 2013 | (KR) | 10-2013-0083491 |
| Jul. 16, 2013 | (KR) | 10-2013-0083492 |
| Jul. 16, 2013 | (KR) | 10-2013-0083493 |

(51) Int. Cl.
*H04M 11/00* (2006.01)
*H04L 12/58* (2006.01)
(Continued)

(52) U.S. Cl.
CPC ............. *H04L 51/04* (2013.01); *G06F 3/0484* (2013.01); *H04L 12/1822* (2013.01); *H04M 1/7253* (2013.01); *H04N 7/147* (2013.01)

(58) Field of Classification Search
CPC ...................................................... H04M 11/00
USPC ............... 345/2, 2.2; 379/93.21, 93.01, 93.17
See application file for complete search history.

(56) References Cited

U.S. PATENT DOCUMENTS

| 9,081,781 B2 * | 7/2015 | Khedouri .......... G06F 17/30038 |
| 2011/0004888 A1 * | 1/2011 | Srinivasan ............ G06F 9/4445 719/329 |

(Continued)

FOREIGN PATENT DOCUMENTS

| JP | 2005-149431 A | 6/2005 |
| JP | 2005-311527 A | 11/2005 |

(Continued)

OTHER PUBLICATIONS

Office Action dated Jan. 26, 2015 in Korean Application No. 10-2013-0083492.
(Continued)

*Primary Examiner* — Olisa Anwah
(74) *Attorney, Agent, or Firm* — Saliwanchik, Lloyd & Eisenschenk

(57) ABSTRACT

A method of sharing a function between terminals is disclosed. A method of sharing a screen in real-time during a chat between terminals may include: transmitting, by a first terminal, a message requesting a real-time screen sharing and chatting while performing a chat with a second terminal; displaying, by the first terminal, an output message indicating start of the real-time screen sharing and chatting when the second terminal is available for the real-time screen sharing and chatting, and when a response message accepting the request for the real-time screen sharing and chatting is received from the second terminal; and sharing, by the first terminal, an image displayed on a screen of the first terminal with the second terminal in real-time, and translucently displaying a chat window that overlaps the shared image and thereby displays a chat content.

35 Claims, 32 Drawing Sheets

(51) Int. Cl.
*G06F 3/0484* (2013.01)
*H04L 12/18* (2006.01)
*H04M 1/725* (2006.01)
*H04N 7/14* (2006.01)

(56) References Cited

U.S. PATENT DOCUMENTS

| | | | | |
|---|---|---|---|---|
| 2012/0005301 A1* | 1/2012 | Braghis | G06F 3/1462 | 709/213 |
| 2012/0011451 A1* | 1/2012 | Bansal | H04N 7/15 | 715/753 |
| 2012/0098733 A1* | 4/2012 | Masuda | G06F 3/1454 | 345/2.2 |
| 2012/0133727 A1* | 5/2012 | Bolduc | H04N 7/152 | 348/14.07 |
| 2013/0073965 A1* | 3/2013 | Sik | G06F 17/30056 | 715/730 |
| 2013/0076764 A1* | 3/2013 | Yada | H04L 12/1827 | 345/520 |
| 2013/0086615 A1* | 4/2013 | Williams | H04N 21/41407 | 725/62 |
| 2013/0159880 A1* | 6/2013 | Bhogal | H04L 65/403 | 715/753 |
| 2013/0290982 A1* | 10/2013 | Beilis | G06F 9/546 | 719/313 |
| 2014/0087654 A1* | 3/2014 | Kiveisha | H04B 5/0031 | 455/41.1 |
| 2014/0146953 A1* | 5/2014 | Sepic | H04M 1/02 | 379/88.23 |
| 2014/0194066 A1* | 7/2014 | Li | | 455/41.3 |

FOREIGN PATENT DOCUMENTS

| | | |
|---|---|---|
| JP | 2006146629 A | 6/2006 |
| JP | 2007-249284 A | 9/2007 |
| JP | 2009284300 A | 12/2009 |
| JP | 2011-044150 A | 3/2011 |
| JP | 2012-075038 A | 4/2012 |
| JP | 2012133668 A | 7/2012 |
| KR | 2005-0004312 A | 1/2005 |
| KR | 20060112092 A | 10/2006 |
| KR | 10-2007-0065688 A | 6/2007 |
| KR | 10-0882937 B1 | 9/2007 |
| KR | 10-0773508 B1 | 11/2007 |
| KR | 10-2009-0070062 A | 7/2009 |
| KR | 2009-0075977 A | 7/2009 |
| KR | 10-2010-0036292 A | 4/2010 |
| KR | 2010-0060498 A | 6/2010 |
| KR | 10-2011-0056638 A | 5/2011 |
| KR | 10-1075736 | 10/2011 |
| KR | 2012-0111859 A | 10/2012 |
| KR | 10-1218294 B1 | 1/2013 |
| KR | 10-2013-0062437 A | 6/2013 |
| KR | 10-2014-0030850 A | 3/2014 |
| WO | WO-2012-134150 A2 | 10/2012 |

OTHER PUBLICATIONS

Office Action dated Feb. 17, 2015 in Japanese Application No. 2013-263500.
Office Action dated Jul. 23, 2014 in Koren Application No. 10-2013-0083493.
Office Action dated Jun. 20, 2014 in Korean Application No. 10-2013-0022491.
Office Action dated Apr. 15, 2014 in Korean Application No. 10-2013-0083490.
Office Action dated Feb. 6, 2014 in Koren Application No. 10-2013-0083490.
Office Action dated Sep. 26, 2014 in Korean Application No. 10-2013-0082885.
Office Action dated Oct. 17, 2014 in Korean Application No. 10-2013-0083491.
Decision of Refusal dated Nov. 17, 2015 in Japanese Application No. 2013-263500.
Korean Office Action dated Aug. 27, 2015 in Korean Application No. 1020130083492.

* cited by examiner

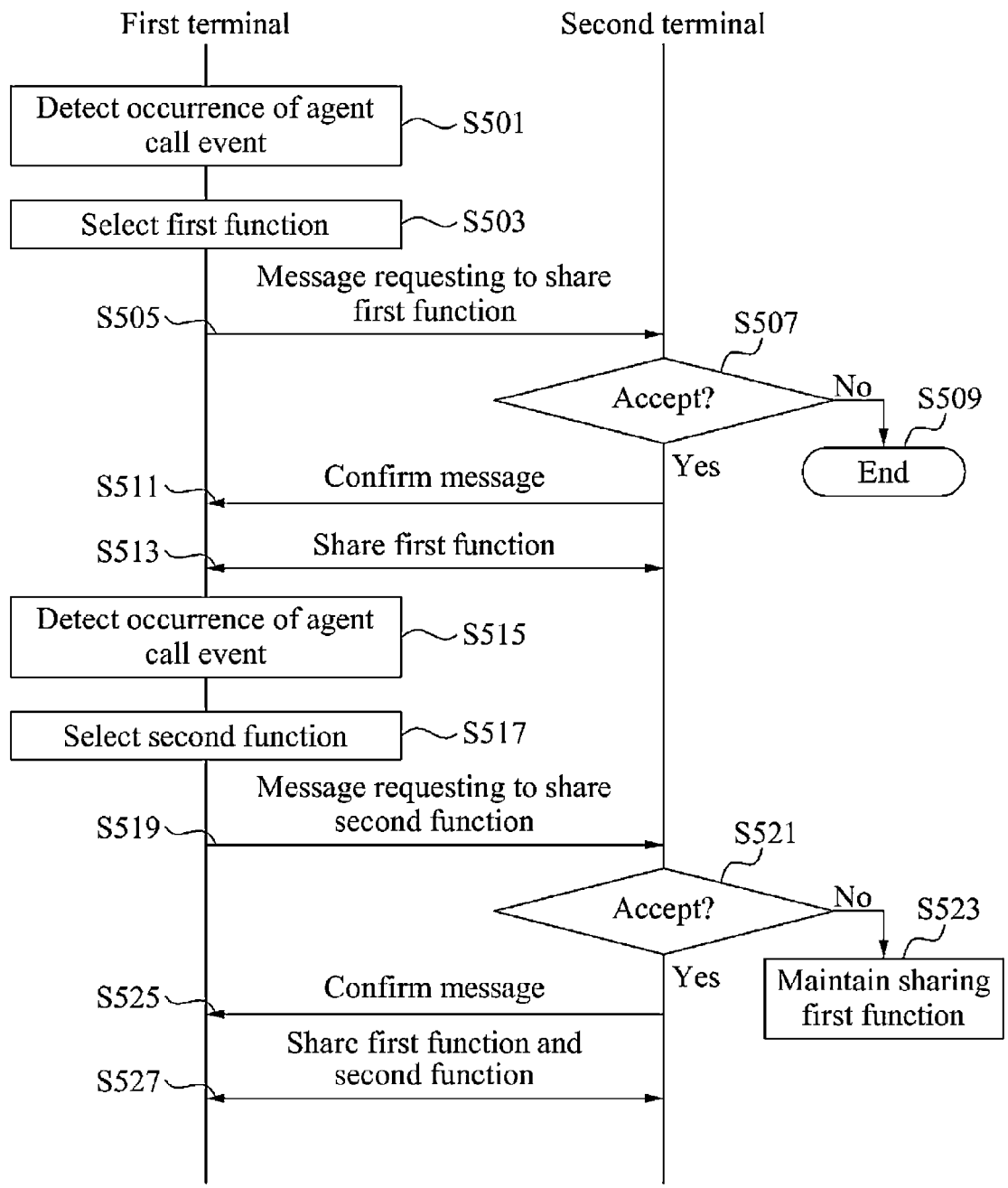

<u>1700</u>

| Group A (1710) | Group B (172) | Group C (1730) |
|---|---|---|
| • Voice call<br>• Video call | • Screen sharing<br>• Camera sharing<br>• Sound sharing<br>• Game | • Sketchy<br>• Chat<br>• Location sharing<br>• Photo/image transmission | even# METHOD FOR SHARING FUNCTION BETWEEN TERMINALS AND TERMINAL THEREOF

CROSS-REFERENCE TO RELATED APPLICATIONS

This application claims the benefit under 35 U.S.C. §119 of Korean Patent Application Nos. 10-2013-0022491, filed Feb. 28, 2013; 10-2013-0082885, filed Jul. 15, 2013; 10-2013-0083490, filed Jul. 16, 2013; 10-2013-0083491, filed Jul. 16, 2013; 10-2013-0083492, filed Jul. 16, 2013; and 10-2013-0083493, filed Jul. 16, 2013, the disclosures of which are incorporated herein by reference in their entirety.

BACKGROUND

1. Field of the Invention

The present invention relates to a method of sharing a function between a plurality of terminals and a terminal thereof, and more particularly, to a method of sharing and thereby executing a function while maintaining a connection between a plurality of terminals and a terminal thereof.

2. Description of the Related Art

A mobile communication system has been developed to guarantee the activity of a user and to provide a voice service. However, the domain of the mobile communication system has been expanded to a data service area in addition to a voice service area. Various types of additional services using a mobile communication terminal are provided. Accordingly, various multimedia contents, such as movie, music, games, stocks, media, and news, applications, solutions, and software, which are available in the mobile communication terminal, have been developed. Such additional services have been further diversified with the development in technology of providing a communication service, such as a voice call service, a video call service, and a text chat service, over an Internet protocol (IP) network.

Currently, a communication service using an IP network may simply transmit sound, images, and texts between terminals. Therefore, while using the communication service, a user cannot share, with a counter party, audio, video, a photo, and a file such as a document, which the user desires to transfer to the counter party. Also, the user cannot share, with the counter party multimedia data, such as a browser screen, an e-mail screen, and a map screen that is being executed. To transfer a file or multimedia data to a terminal of the counter party while using the communication service, the file or the multimedia data needs to be transmitted over another wired/wireless communication network and thereby can be shared with the counter party.

Accordingly, there is a need for technology capable of achieving more interactive communication by enabling a variety of information to be shared between users during communication.

BRIEF SUMMARY

An aspect of the present invention provides a method and apparatus for sharing and thereby executing the same function while maintaining a communication between a plurality of terminals.

Another aspect of the present invention also provides a method and apparatus for readily switching a communication pattern while maintaining a call.

Another aspect of the present invention also provides a method and apparatus for continuing a call while viewing or listening to the same material together.

Another aspect of the present invention also provides a method and apparatus for sharing a screen between a plurality of terminals in real-time and at the same time, performing a chat between the plurality of terminals.

Features to be achieved by the invention are not limited to the aforementioned features, and additional features of the invention will be set forth in the description which follows, and in part will be apparent from the description, or may be learned by practice of the invention.

According to an aspect of the present invention, there is provided a method of sharing a function between terminals, the method including: receiving, by a first terminal, a selection on a first function to be shared with another terminal and thereby executed; receiving, by the first terminal, a selection on a second terminal to share and thereby execute the first function; transmitting, by the first terminal to the second terminal, a request message requesting to share and thereby execute the first function; and sharing, by the first terminal, and thereby executing the first function with the second terminal by establishing a wireless communication with the second terminal.

The method may further include receiving, by the first terminal, a selection on a second function to be executed with the second terminal while sharing and thereby executing the first function with the second terminal. The first terminal may share and thereby execute the first function and the second function with the second terminal.

The method may further include: receiving, by the first terminal, a selection on a third terminal to share and thereby execute the third function; transmitting, by the first terminal to the third terminal, a request message requesting to share and thereby execute the first function; and sharing, by the first terminal, and thereby executing the first function with the third terminal by establishing a wireless communication with the third terminal.

The method may further include: receiving, by the first terminal from the second terminal, a message requesting adding of a third terminal in order to share and thereby execute the first function; transmitting, by the first terminal to the third terminal, a request message requesting to share and thereby execute the first function; and sharing, by the first terminal, and thereby executing the first function with the third terminal by establishing a wireless communication with the third terminal.

The first function may correspond to any one of a voice call function, a video call function, a screen sharing function of displaying a screen of one terminal to be the same on a counter party terminal, an audio sharing function of outputting sound of one terminal alike to the counter party terminal, a control function of enabling one terminal to remotely control the counter party terminal, a sketchy function of displaying a touch input of one terminal to be the same on the counter party terminal, a file transmission function of transmitting a file of one terminal to the counter party terminal, a camera sharing function of displaying a camera image installed in one terminal to be the same on the counter party terminal, and a location sharing function of displaying a location of one terminal on the counter party terminal.

The screen sharing function may be a function of capturing a screen of one terminal for at least 15 frames per second, compressing an image of the captured screen as a moving picture, and transmitting the moving picture to the counter party terminal.

The audio sharing function may be a function of capturing a sound output from one terminal, compressing the captured sound to an MPEG Audio Layer 3 (MP3) file, and transmitting the MP3 file to the counter party terminal.

According to an aspect of the present invention, there is provided a method of sharing a function between terminals, the method including: receiving, by a first terminal, a selection on a second function to be shared and thereby executed while sharing and thereby executing a first function with a second terminal by establishing a wireless communication with the second terminal; and sharing, by the first terminal, and thereby executing the first function and the second function with the second terminal.

The method may further include: receiving, by the first terminal, a selection on a third terminal to share and thereby execute the first function and the second function; transmitting, by the first terminal to the third terminal, a request message requesting to share and thereby execute the first function and the second function; and sharing, by the first terminal, and thereby executing the first function and the second function with the third terminal by establishing a wireless communication with the third terminal.

The method may further include: receiving, by the first terminal from the second terminal, a message requesting adding of a third terminal in order to share and thereby execute the first function and the second function; transmitting, by the first terminal to the third terminal, a request message requesting to share and thereby execute the first function and the second function; and sharing, by the first terminal, and thereby executing the first function and the second function with the third terminal by establishing a wireless communication with the third terminal.

According to an aspect of the present invention, there is provided a method of sharing a function between terminals, the method including: receiving, by a first terminal, a selection on a second function to be shared and thereby executed with the second terminal while sharing and thereby executing a first function with a second terminal by establishing a wireless communication with the second terminal; and replacing, by the first terminal, the first function with the second function and sharing and thereby executing the second function with the second terminal.

The method may further include: receiving, by the first terminal, a selection on a third terminal to share and thereby execute the second function; transmitting, by the first terminal to the third terminal, a request message requesting to share and thereby execute the second function; and sharing, by the first terminal, and thereby executing the second function with the third terminal by establishing a wireless communication with the third terminal.

According to an aspect of the present invention, there is provided a method of sharing a function between terminals, the method including: receiving, by a first terminal, a selection on a first function and a second function to be shared with another terminal and thereby executed; receiving, by the first terminal, a selection on a second terminal to share and thereby execute the first function and the second function; transmitting, by the first terminal to the second terminal, a request message requesting to share and thereby execute the first function and the second function; and sharing, by the first terminal, and thereby executing the first function and the second function with the second terminal by establishing a wireless communication with the second terminal.

The method may further include: receiving, by the first terminal, a selection on a third terminal to share and thereby execute the third function and the second function; transmitting, by the first terminal to the third terminal, a request message requesting to share and thereby execute the first function and the second function; and sharing, by the first terminal, and thereby executing the first function and the second function with the third terminal by establishing a wireless communication with the third terminal.

The method may further include: receiving, by the first terminal from the second terminal, a message requesting adding of a third terminal in order to share and thereby execute the first function and the second function; transmitting, by the first terminal to the third terminal, a request message requesting to share and thereby execute the first function and the second function; and sharing, by the first terminal, and thereby executing the first function and the second function with the third terminal by establishing a wireless communication with the third terminal.

According to an aspect of the present invention, there is provided a method of sharing a screen in real-time during a chat between terminals, the method including: transmitting, by a first terminal to a second terminal, a message requesting a real-time screen sharing and chatting while performing a chat with the second terminal; receiving, by the first terminal from the second terminal, a response message accepting the request for the real-time screen sharing and chatting when the second terminal is available for the real-time screen sharing and chatting; and sharing, by the first terminal, an image displayed on a screen of the first terminal with the second terminal in real-time, and translucently displaying a chat window that overlaps the shared image and thereby displays a chat content.

The method may further include displaying, by the first terminal, an output message indicating start of the real-time screen sharing and chatting in response to receiving the response message.

The method may further include displaying, by the first terminal, a chat window control icon on the screen of the first terminal. The chat window may be displayed on or removed from the screen of the first terminal in response to a touch input on the chat window control icon.

The method may further include displaying a menu of the real-time screen sharing and chatting. The menu may include at least one of a moving picture sharing function, a news sharing function, a music sharing function, a map sharing function, a photo/image sharing function, and a handwriting-on-screen function.

The method may further include displaying a menu of the real-time screen sharing and chatting. The menu may include at least one of a function of immediately executing a registered application, a function of capturing the screen of the first terminal and saving the captured screen in an image file format, and a function of controlling a transparency of the chat window.

The method may further include displaying a menu of the real-time screen sharing and chatting. The menu may include a function of pausing the real-time screen sharing and chatting or a function of resuming the paused real-time screen sharing and chatting.

The first terminal may share audio or sound output from the first terminal or input to the first terminal with the second terminal in real-time.

According to an aspect of the present invention, there is provided a method of sharing a screen in real-time during a chat between terminals, the method including: transmitting, by a first terminal to a second terminal, a message requesting a real-time screen sharing and chatting while sharing an image displayed on a screen of the first terminal with the second terminal in real-time; receiving, by the first terminal from the second terminal, a response message accepting the request for the real-time screen sharing and chatting when the second terminal is available for the real-time screen sharing and chatting; and translucently displaying, by the first terminal, a chat window that overlaps the shared image and thereby displays a chat content.

The method may further include displaying, by the first terminal, an output message indicating start of the real-time screen sharing and chatting in response to receiving the response message.

According to an aspect of the present invention, there is provided a method of sharing a screen in real-time during a chat between terminals, the method including: receiving, by a second terminal from a first terminal, a message requesting a real-time screen sharing and chatting while performing a chat with the first terminal; displaying, by the second terminal, an output message indicating a query as to whether to accept the request for the real-time screen sharing and chatting when the second terminal is available for the real-time screen sharing and chatting; transmitting, by the second terminal to the first terminal, a response message accepting the request for the real-time screen sharing and chatting in response to receiving an acceptance on the request for the real-time screen sharing and chatting; and sharing, by the second terminal, and thereby outputting an image displayed on a screen of the first terminal, and translucently displaying a chat window that overlaps the shared image and thereby displays a chat content.

According to an aspect of the present invention, there is provided a method of sharing a screen in real-time during a chat between terminals, the method including: receiving, by a second terminal from a first terminal, a message requesting a real-time screen sharing and chatting while sharing and thereby outputting an image displayed on a screen of a first terminal; displaying, by the second terminal, an output message indicating a query as to whether to accept the request for the real-time screen sharing and chatting when the second terminal is available for the real-time screen sharing and chatting; transmitting, by the second terminal to the first terminal, a response message accepting the request for the real-time screen sharing and chatting in response to receiving an acceptance on the request for the real-time screen sharing and chatting; and translucently displaying, by the second terminal, a chat window that overlaps the shared image and thereby displays a chat content.

According to an aspect of the present invention, there is provided a terminal including: an output unit configured to output information on a screen; a transceiver configured to transmit a message requesting a real-time screen sharing and chatting during a chat between the terminal and a second terminal; and a controller configured to share, with the second terminal in real-time, an image displayed on a screen through the output unit and to translucently display a chat window that overlaps the shared image and thereby displays a chat content, in response to receiving a response message accepting the request for the real-time screen sharing and chatting from the second terminal through the transceiver.

The controller may be configured to display, through the output unit, an output message indicating start of the real-time screen sharing and chatting in response to receiving the response message.

According to an aspect of the present invention, there is provided a terminal including: an output unit configured to output information on a screen; a transceiver configured to transmit, to a second terminal, a message requesting a real-time screen sharing and chatting while sharing, with the second terminal in real-time, an image displayed on a screen through the output unit; and a controller configured to translucently display a chat window that overlaps the shared image and thereby displays a chat content, in response to receiving a response message accepting the request for the real-time screen sharing and chatting from the second terminal through the transceiver.

The controller may be configured to display, through the output unit, an output message indicating start of the real-time screen sharing and chatting in response to receiving the response message.

According to an aspect of the present invention, there is provided a terminal including: a transceiver configured to receive, from a first terminal, a message requesting a real-time screen sharing and chatting during a chat between the terminal and the first terminal; an output unit configured to display an output message indicating a query as to whether to accept the request for the real-time screen sharing and chatting when the terminal is available for the real-time screen sharing; and a controller configured to transmit, to the first terminal, a response message accepting the request for the real-time screen sharing and chatting through the transceiver in response to receiving an acceptance on the request for the real-time screen sharing and chatting, to share and thereby output an image displayed on a screen of the first terminal through the output unit in real-time, and to translucently display a chat window that overlaps the shared image and thereby displays a chat content.

According to an aspect of the present invention, there is provided a terminal including: a transceiver configured to receive, from a first terminal, a message requesting a real-time screen sharing and chatting while sharing and thereby outputting an image displayed on a screen of the first terminal; an output unit configured to display an output message indicating a query as to whether to accept the request for the real-time screen sharing and chatting when the terminal is available for the real-time screen sharing and chatting; and a controller configured to transmit, to the first terminal, a response message accepting the request for the real-time screen sharing and chatting through the transceiver in response to receiving an acceptance on the request for the real-time screen sharing and chatting, and to translucently display a chat window that overlaps the shared image and thereby displays a chat content.

According to an aspect of the present invention, there is provided a method of sharing a screen between terminals, the method including: executing a screen sharing function of a first terminal to share a screen of the first terminal with a second terminal; detecting a new call received at the first terminal while the screen sharing function of the first terminal is being executed; and pausing the screen sharing function based on a function corresponding to the new call among a plurality of functions.

The executing may include providing an interface associated with the plurality of functions in response to detecting a gesture of a user on a displayed icon. The method may further include resuming the paused screen sharing function in response to the gesture of the user on the displayed icon detected while pausing the screen sharing function.

The pausing may include checking a function setting table indicating settings of a user with respect to the plurality of functions, in response to detecting the new call.

The pausing may include pausing a sound sharing function together with the screen sharing function when the new call is a call for a voice call or a video call.

A graphic effect of a screen displayed on the second terminal may be changed in response to pausing the screen sharing function of the first terminal.

According to an aspect of the present invention, there is provided a method of displaying an interface of an application during a video call, the method including: activating a resource of a terminal used to execute a video call application in response to executing the video call application; monitoring whether another application is being executed while the video call application is being executed; and overlaying a screen corresponding to the other application on a screen corresponding to the video call application based on a type of the other application.

The overlaying may include overlaying the screen corresponding to the other application on the screen corresponding to the video call application based on a transparency of an interface of the other application or an overlay probability with the screen corresponding to the video call application.

The overlaying may include opaquely displaying the screen corresponding to the video call application and transparently or translucently displaying the screen corresponding to the other application on the screen corresponding to the video call application.

The overlaying may include terminating the video call and outputting the screen corresponding to the other application when the screen corresponding to the other application is opaque.

The method may further include modifying the whole or a portion of the overlaid screen corresponding to the other application.

The modifying may include: detecting a physical stimulus applied on a portion of the overlaid screen corresponding to the other application; and modifying the overlaid screen corresponding to the other application based on the detected physical stimulus.

The modifying the whole or a portion of the overlaid screen corresponding to the other application may include: detecting a drag motion applied on a portion of the overlaid screen corresponding to the other application; and rolling up the overlaid screen of the other application in a direction of the detected drag motion.

The modifying the whole or a portion of the overlaid screen corresponding to the other application may include: detecting a touch motion applied on a button displayed on a portion of a screen of the terminal; and replacing the screen corresponding to the other application with the button displayed on the portion of the screen.

The method may further include: detecting a touch motion applied on the button; and displaying the screen corresponding to the other application.

The method may further include displaying, on a screen of the terminal, a graphic effect indicating that the overlaid screen of the other application is in a rolled-up state in response to the drag motion.

The method may further include displaying the screen corresponding to the video call application at a lower end of the graphic effect indicating that the overlaid screen corresponding to the other application is in the rolled-up state in response to the drag motion.

The method may further include: detecting a drag motion applied on a portion of the graphic effect; and rolling down the graphic effect to be in a state before the overlaid screen corresponding to the other application is rolled up in response to the drag motion, in a direction of the detected drag motion.

According to an aspect of the present invention, there is provided a method of sharing a function, the method including: receiving a function sharing request in order to commonly execute at least two functions among a plurality of users; determining whether the at least two functions include a voice call function or a video call function in response to the function sharing request; and displaying an acceptance confirm message inquiring about whether to accept the function sharing request based on whether the at least two functions include the voice call function or the video call function.

The displaying may include initially displaying an acceptance confirm message inquiring about whether to share the voice call function or the video call function and then, displaying an acceptance confirm message inquiring about whether to accept a request for sharing a function excluding the voice call function or the video call function from among the at least two functions when the voice call function or the video call function is accepted.

The method may further include refusing the function sharing request without inquiring about whether to accept the request for sharing the function excluding the voice call function or the video call function from among the at least two functions when the voice call function or the video call function is refused.

According to an aspect of the present invention, there is provided a method of switching between a video call and a voice call, the method including: receiving a command to execute a predetermined function during a video call between terminals; detecting a resource of a terminal used by the predetermined function; and determining whether to switch a video call mode to a voice call mode based on the detected resource of the terminal.

The detecting may include detecting whether the predetermined function uses the resource of the terminal used to perform the video call.

The determining may include determining whether the predetermined function and the video call are capable of using the same resource at the same time.

The determining whether the predetermined function and the video call are capable of using the same resource at the same time may include determining whether the predetermined function and the video call are capable of simultaneously using the same resource of the terminal at the same time, based on whether an image output of the predetermined function is capable of being overlapped on a screen of the video call.

The method may further include automatically switching the video call to the voice call based on a result of the determining, or simultaneously displaying a screen of the video call and a screen of the predetermined function on a terminal having received the command to execute the predetermined function by adjusting a display effect of the video call and a display effect of the predetermined function.

The detecting may include verifying whether the predetermined function uses an image input device or an image output device.

The method may further include outputting a message notifying a user of a terminal having received the command to execute the predetermined function about switching of a call mode when the video call mode is determined to be switched to the voice call mode.

According to an aspect of the present invention, there is provided a method of switching between a video call and a voice call, the method including: receiving a command to execute a predetermined function during a video call between terminals; obtaining information on an interface characteristic of the predetermined function; and determining whether to switch a video call mode to a voice call mode based on the obtained information on the interface characteristic of the predetermined function.

The obtaining may include obtaining information on a transparency of an interface of the predetermined function.

The method may further include automatically switching the video call to the voice call based on a result of the determining, or simultaneously displaying a screen of the video call and a screen of the predetermined function on a terminal receiving the command to execute the predetermined function by adjusting a display effect of the video call and a display effect of the predetermined function.

The determining may include determining whether an interface of the predetermined function is to overlap an interface of the video call.

The method may further include outputting a message notifying a user of a terminal having received the command to execute the predetermined function about switching of a call mode when the video call mode is determined to be switched to the voice call mode.

According to an aspect of the present invention, there is provided a method of sharing a location between terminals, the method including: displaying a location of each of a plurality of terminals on a map provided in each of the plurality of terminals to share locations of the plurality of terminals; and executing at least one function in response to a request for executing the at least one function among a plurality of functions executable on the map, which is received from the plurality of terminals.

The executing may include changing a scale of the map or moving the map, and the method may further include transmitting information on the scale changed map or the moved map to other terminals.

The method may further include: requesting to share a location of any one terminal among the plurality of terminals so that the one terminal and other terminals share locations; and displaying a confirm message before a location of a first terminal is displayed on the map.

The executing may include adding a target location on the map in response to detecting a gesture on an icon displayed on the plurality of terminals.

The executing may include: activating a trace function in response to detecting a gesture on an icon displayed on the plurality of terminals; and displaying information on a travel path of each of the plurality of terminals on the map in response to activating the trace function.

The displaying may include displaying, on the map, a first identifier of each of the plurality of terminals having accepted the location sharing at a location of each of the plurality of terminals having accepted the location sharing, and displaying, on an outside of the map, a second identifier of each of the plurality of terminals having accepted the location sharing.

The method may further include moving the map based on a location of a terminal corresponding to a selected second identifier when the predetermined second identifier is selected from among second identifiers of the plurality of terminals having accepted the location sharing.

The displaying the second identifier on the outside of the map may further include displaying the second identifier on the outside of the map in response to selecting a screen movement button.

The method may further include determining a scale of the map based on the location of each of the plurality of terminals.

The method may further include detecting, from among the plurality of terminals, at least one terminal having a control right capable of executing a plurality of functions on the map. The requested at least one function may be executed in response to a request for executing the at least one function among the plurality of functions executable on the map, which is received from the at least one terminal having the control right.

Effects of the Invention

According to embodiments of the present invention, it is possible to share and thereby execute the same function while maintaining a communication between a plurality of terminals.

Also, according to embodiments of the present invention, it is possible to readily switch a communication pattern while maintaining a call.

Also, according to embodiments of the present invention, it is possible to continue a call while viewing or listening to the same material together.

Also, according to embodiments of the present invention, it is possible to share a screen between a plurality of terminals in real-time and at the same time, to perform a chat between the plurality of terminals.

Effects to be achieved by the invention are not limited to the aforementioned effects, and additional effects of the invention will be set forth in the description which follows, and in part will be apparent from the description, or may be learned by practice of the invention.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 5 is a flowchart illustrating a method of sharing a function between terminals according to an embodiment of the present invention.

DETAILED DESCRIPTION

Figure 1:
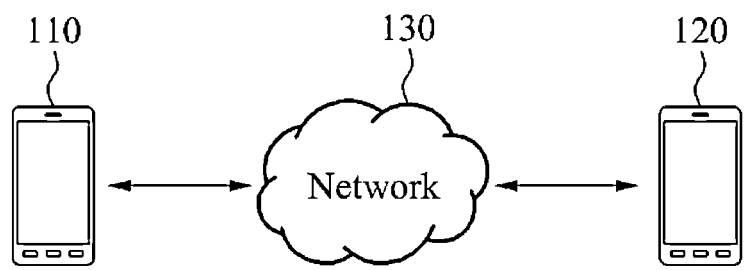
FIG. 1 is a diagram illustrating a system for sharing a function between terminals according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Hereinafter, embodiments of the present invention are described with reference to the accompanying drawings and the detailed description to be disclosed in the following is provided to describe an exemplary embodiment of the invention and is not provided to express a sole embodiment of the invention. The following description may include specific and detailed descriptions in order to provide the full understanding of the invention. Also, procedures, operations, and the like, which may render the technical spirit of the invention ambiguous, may be omitted in the drawings. Further, procedures, operations, and the like, which are known and understandable by those skilled in the art are not described.

Throughout the present specification, that a predetermined portion "comprises" or "includes" a predetermined constituent element indicates that the predetermined portion may further include another constituent element instead of excluding the other constituent element, unless particularly differently described. Also, the terms "~unit", "~er/or", "~module", and the like, used in the specification, may indicate a unit for processing at least one function or operation and may be configured by hardware, software, or a combination of hardware and software. In addition, unless differently instructed or clearly contradicted in the context of the invention, for example, in the context of the claims, singular expressions, such as "a/an", "one", "the", and words similar thereto, may be used to include both singular and plural meanings.

Predetermined terms used in embodiments of the invention are provided to complement the understanding of the invention and thus, may be changed without departing from the technical spirit of the invention.

FIG. 1 is a diagram illustrating a system (hereinafter, a function sharing system) for sharing a function between terminals according to an embodiment of the present invention.

Referring to FIG. 1, the function sharing system may include a first terminal 110, a second terminal 120, and a network 130. The function sharing system described in the following may include at least one of constituent elements of FIG. 1, however, is not limited thereto.

The first terminal 110 and the second terminal 120 refer to terminals that share at least two mutual functions over the network 130 and/or interact with each other. The first terminal 110 and the second terminal 120 may refer to terminals that may seamlessly share and thereby execute another function during a communication such as a voice call, a video call, and/or a chat therebetween. Even though only the first terminal 110 and the second terminal 120 are illustrated in FIG. 1, the function sharing system according to the present invention may include more terminals. For example, at least two terminals may be provided with a function sharing service according to the present invention.

As described above, to share a function between terminals, a connection between terminals may be preferentially established in such a manner that one terminal transmits a function sharing request to the other terminal, and the other terminal responds to the function sharing request. Here, one terminal may also request a plurality of other terminals to share a function. Also, a plurality of functions may be shared between a plurality of connection-established terminals. For example, after a connection between terminals is established to share one of the plurality of functions, another function to be shared may be added.

A function of a terminal used in the present specification may refer to all the functions executable in the terminal. Also, the function of the terminal may include a function basically installed in the terminal and a function provided from an application installed through downloading. Examples of the function may include a function of sharing a screen between terminals, an audio sharing function, a control function, a sketchy function, a file transmission function, a camera sharing function, a location sharing function, and the like, and may also include a communication service such as a voice call, a video call, and a chat.

Referring to each function of a terminal, a text chat function may refer to a service that enables global communication users to exchange messages in various forms based on a rich communication suite (RCS), and may also enable a one-to-one text chat or a group chat between a plurality of users. A sketchy function may refer to a service that enables a user to communicate with a counter party using a handwriting or a picture. That is, the sketchy function enables the same touch input, for example, a handwriting and a picture, received from a user to be displayed on a terminal of the counter party. An audio sharing function may refer to a service that enables only audio output from a terminal to be shared. Here, noise from an outside is not shared. A screen sharing function may refer to a service that enables a user to share a terminal screen of the user with a counter party. A screen corresponding to the text chat function and a screen corresponding to the sketchy function may not be shared. A location sharing function may refer to a service that enables a user to share a location of the user, a location of a counter party, or a desired location with the counter party. A camera sharing function may refer to a service that enables a user to share a screen being taken by a camera of the user with a counter party. A control function may refer to a service that enables a user to remotely control a terminal of a counter party through a screen output from the terminal of the counter party. Such a control right may proceed only when an acceptance is received from a terminal being controlled. The control right may be granted to only one user. A file transmission function may refer to a service of transmitting a photo, an image, an address log, a document, and the like using an RCS file transmission function and the like.

When a screen of a first terminal is shared with a second terminal based on a screen sharing function, the first terminal may capture the screen of the first terminal for at least 15 frames per minutes, may compress an image of the captured screen as a moving picture, and may transmit the compressed moving picture to the second terminal. Here, a number of frames to be capture per minute may be adjusted.

When sound output from the first terminal is shared with the second terminal based on an audio sharing function, the first terminal may capture the sound output from the first terminal, may compress the captured sound to an MPEG Audio Layer 3 (MP3) file using an MP3 method, and transmit the MP3 file to the second terminal.

Hereinafter, examples of sharing a function between terminals using the aforementioned terminal functions are described. As an example of the screen sharing function or the audio sharing function, a user may perform a voice/audio call or a text chat while streaming and thereby mirroring a screen or audio output on a terminal of the user to a terminal of a counter party during the voice/audio call or the text chat. Also, as an example of the control function, a user may control a setting of a terminal of a counter party to be changed or may control a content transmission to receive the content of the terminal of the counter party while mirroring a screen of the counter party. As an example of the sketchy function, the same text, picture, and the like input from a terminal of a user may be displayed on a terminal of a counter party and also be stored therein while mutually outputting the same screen. As described above, by outputting the same screen and user input at both terminals, users may edit a document in real-time while sharing various types of documents and the like. As an example of the camera sharing function, a user may perform a voice call or a text chat while outputting, to be the same on both terminals as a background screen, a scene being viewed by one user through a camera of a terminal of the user. As an example of the location sharing function, current locations may be shared and be displayed to be the same on screens of both terminals. As an example of the file transmission function, a file, such as a photo, music, a document, and a text file, may be transmitted from a terminal of a user to a terminal of a counter party while sharing the aforementioned functions. Also, users may perform a voice call or a text chat simultaneously while interactively executing the same application in both terminals.

Also, communication services may be switched. For example, a call may be switched to a video call or a text chat without disconnecting a voice call.

Also, a service of sharing a function between terminals proposed in the present invention is not limited to two terminals and may enable the same function to be shared among two or more terminals. In this case, a third communication terminal may be added while a function is being shared between both terminals. For example, when a third terminal is added while sharing a screen or voice or while executing a separate application, the added third terminal may share the same screen and voice and may also share the same function when the same application is executed.

Also, switching between a text and voice may be performing using a speech to text (STT) function or a text to speech (TTS) function. For example, a mutual communication may be performed in such a manner that a voice call service is performed in a terminal and a text chat service is performed in a counter party terminal by supporting contents of a voice call as subtitles.

Examples of the first terminal 110 and the second terminal 120 may include a mobile phone, a smart phone, a tablet personal computer (PC), a personal digital assistant (PDA), a portable multimedia player (PMP), a cellular phone, a personal communication service (PCS) phone, a global system for mobile (GSM) phone, a wideband code division multiple access (WCDMA) phone, a mobile broadband system (MBS) phone, and the like. Although only mobile terminals are illustrated in FIG. 1, a PC, a notebook computer, and the like may also be included. The above terminals are only an example and thus, any type of communication device currently being developed and commercialized or to be developed in the future should be understood to be included.

The network 130 may refer to a data communication network for data transmission and information exchange between the first terminal 110 and the second terminal 120, and a type of the network 130 is not particularly limited. For example, the network 130 may be an IP network configured to provide a large data transmission/reception service and a seamless data service through an IP and thus, may refer to an all-IP network having an IP network structure in which different networks are integrated based on an IP. Also, the network 130 may be configured by combining at least one of a wired network, a Wireless Broadband (WiBro) network, a World Interoperability for Microwave Access (WiMAX) network, and a mobile communication network including a wideband code division multiple access (WCDMA) network, a mobile communication network including a high speed downlink packet access (HSDPA) network and a long term evolution (LTE) network, a mobile communication network including an LTE Advanced network, a satellite communication network, a wireless local area network (WLAN), and a wireless fidelity (Wi-Fi) network.

Hereinafter, for clarity of description, a description is made by omitting a type of the first terminal 110 or the second terminal 120 and by illustrating only a screen output on each terminal.

Hereinafter, the term "participant terminal" may refer to all the terminals connected to share a function between terminals, and the term "inviting terminal" may refer to a terminal that adds a connection of a third terminal, which is not currently connected, in order to share a function among participant terminals. The term "invited terminal" may refer to a terminal of which a connection is added by an inviting terminal. Also, the term "source sharing terminal" may refer to a terminal that shares a screen or audio of the terminal with another connected terminal, for example, another participant terminal, and the term "shared terminal" may refer to a terminal that is allowed by a sharing terminal to share a screen or audio of the sharing terminal. Also, the term "sending terminal" may refer to a terminal from which a voice call or a video call is originated, and the term "receiving terminal" may refer to a terminal that receives the voice call or the video call.

Describing connection states of a terminal, a "function-on state" may refer to a state in which a connection between participant terminals is established for a function sharing and a corresponding function is being shared between the participant terminals. Here, a terminal, such as an inviting terminal, that is to add a third terminal, which is not currently connected, or a terminal to be added to share another function excluding a currently sharing function may maintain a connection state to be a function-on state with respect to the corresponding function.

A "function-off state" may refer to a state in which a connection between participant terminals is disconnected with respect to a corresponding function.

A "function-pause state" may refer to a state in which a connection between participant terminals is established for a function sharing, but a corresponding function is not being shared between the participant terminals. That is, the "function-pause state" may refer to a state in which the connection between the participant terminals is established to share another function, but the corresponding function is not being shared between the participant terminals.

An "out state" may refer to a state in which a connection between participant terminals is disconnected with respect to all the functions.

Here, the function-off state and the function-pause state may be switched with the function-on state based on a selection input of a user. For example, in response to a touch input of a user on an icon corresponding to a function in the function-on state, the function-on state of the function may be switched to the function-off/pause state. In response to a touch input of a user on an icon corresponding to a function in the function-off/pause state, the function-off/pause state of the function may be switched to the function-on state.

When two participant terminals are connected only for a function sharing, the function-on state may not be switched to the function-pause state and may be switched only to the function-off state. That is, in response to a touch input of a user occurs on an icon corresponding to a function in the function-on state in one of participant terminals, the function-on state is immediately switched to the function-off state whereby the connection between the participant terminals is immediately disconnected with respect to the corresponding function. When a connection between participants is established with respect to at least two functions, and when a state of one of the participant terminals is switched to the function-off state with respect to one of the at least two functions, the connection between the participant terminals may be disconnected with respect to the corresponding function, but may be maintained to be in the function-on state with respect to remaining functions.

When at least three participant terminals are connected for a function sharing, different operations may be performed based on a number of connected functions.

When at least three participant terminals are connected to share only a single function, the function-on state may not be switched to the function-pause state and may be switched only to the function-off state. As described above, in response to a touch input of a user on an icon corresponding to a function in the function-on state in a portion of the participant terminals, the function-on state is immediately switched to the function-off state whereby a connection between the portion of the participant terminals and remaining participant terminals is immediately disconnected with respect to the corresponding function. Here, the remaining participant terminals may maintain the function-on state with respect to the corresponding function.

When at least three participant terminals are connected to share at least two functions, a portion of the participant terminals may be switched to the function-pause state with respect to a predetermined function, and in this case, may maintain the function-on state with respect to a remaining function of which a state is not switched to the function-pause state. That is, in response to a touch input of a user on an icon corresponding to a function in the function-on state in a portion of the participant terminals, the function-on state is immediately switched to the function-pause state whereby a connection between the portion of the participant terminals and other participant terminals is disconnected with respect to the corresponding function, but may be maintained with respect to a remaining function. Here, a terminal switched to the function-pause state may request again a participant terminal that is still in the function-on state with respect to the corresponding function to share the corresponding function. When the connection therebetween is established with respect to the corresponding function, the terminal may be switched again to the function-on state.

Even though at least three participant terminals are connected to share at least two functions, a connection state of a source sharing terminal or a terminal performing a control function may be immediately switched to the function-off state.

More specifically, in response to a touch input of a user on an icon corresponding to a screen, audio, and camera function in a source sharing terminal sharing the screen, audio, and camera function, the screen, audio, and camera function may be immediately switched to the function-off state and a connection between the source sharing terminal and a participant terminal with respect to the screen, audio, and camera function may be disconnected. In this case, a shared terminal may also be switched to the function-off state with respect to the screen, audio, and camera function. In response to a touch input of a user on an icon corresponding to a control function in a terminal controlling a counter party terminal among terminals connected to share the control function, the control function may be immediately switched to the function-off state and a control right may be restored to a terminal being controlled and thus, the terminal being controlled may control the terminal itself again.

Also, when at least three terminals are connected to share at least two functions, switching a connection state of any one of the terminals may affect connection states of remaining participant terminals. For example, when a connection state of a sending terminal is switched to the out state, connection states of receiving terminals, for example, participant terminals excluding the sending terminal may be switched to the function-pause state. In this case, when a voice/video call is connected between one of shared terminals switched to the function-pause state and a remaining participant terminal, the connected terminals may be switched to the function-on state with respect to a voice/video call function. Also, when a connection state of a source sharing terminal sharing its screen, audio, and camera function is switched to the out state, connection states of shared terminals, for example, participant terminals excluding the source sharing terminal may be switched to the function-off state. Also, when a connection state of a terminal sharing its location information is switched to the out state, terminals sharing the location information, for example, participant terminals excluding the terminal sharing its location information may delete the location information.

Participant terminals that are in the function-on state through a connection establishment may add another function to be shared in addition to a function currently being shared.

Adding a function to be shared between terminals may be performed by any participant terminal. Here, when at least three participant terminals are present, and when at least one of the participant terminals accepts a function adding request received from another participant terminal, the corresponding function may be added. A connection state of a participant terminal having refused the function adding request may be maintained as the function-pause state with respect to the corresponding function. However, a sketchy function or a text chat function may be added even though other participant terminals do not accept the function adding request. Also, a predetermined standby time, for example, 30 seconds, for the function addition may be determined. Accordingly, when no acceptance is received from participant terminals within the standby time in response to the function adding request, the function adding request may be cancelled and connection states of the participant terminals may be maintained as the function-off state with respect to the corresponding function.

A function replacement may refer to replacing a function currently being shared because a function to be added and a function currently being shared may not be simultaneously executed when one of participant terminals is to add another function while sharing a predetermined function. In this case, a function being shared between the participant terminals may be terminated, and may be replaced with another function requested to be added. A function switching may refer to switching a sharing function to an auxiliary function when the function replacement is performed. For example, when a function of using an opaque screen during a video call between participant terminals, the video call being shared may be replaced with a function to be newly added and the video call may be switched to a voice call. Here, the function replacement or the function switching may be performed only when an acceptance is received from all the participant terminals and thus, may not be performed when a refusal is received from at least one of the participant terminals. Also, a predetermined standby time, for example, 30 seconds, for the function replacement or the function switching may be determined. Accordingly, when no acceptance is received from participant terminals within the determined standby time in response to the request for the function replacement or function switching, the request for the function replacement or function switching may be cancelled. Also, even though a corresponding function end time comes, a function replaced or switched after the function replacement or the function switching is performed may not be automatically restored to an existing function.

As described above, when two participant terminals are connected for a function sharing, and when one of the participant terminals terminates a sharing function, a connection state of the corresponding terminal may be switched to the function-off state with respect to the corresponding function. Also, when at least three participant terminals are connected for a function sharing and when one of the participant terminals terminates a corresponding function, a connection state of the corresponding terminal may be switched to the function-pause state with respect to the corresponding function. Also, when at least three participant terminals are connected for a function sharing, and when a connection state of a portion of the participant terminals is switched to the function-pause state and thus, one or less participant terminal is in the function-on state, connection states of participant terminals may be switched to the function-off state with respect to the corresponding function. Also, when at least three participant terminals are connected for a function sharing, and when connection states of all the participant terminals are in the out state and only one terminal remains, a connection may be terminated with respect to all the functions.

Participant terminals that are in the function-on state through a connection establishment may add a third terminal, for example, an invited terminal, to their group for a function sharing.

As described above, when an inviting terminal adds an invited terminal to its group, the inviting terminal may request the invited terminal for a connection with respect to all the functions currently being shared within the group, for example, functions that are in the function-on state and the function-pause state. The invited terminal may accept all the functions included in the received request and may also accept only a portion of the functions. In this example, a connection state of the invited terminal may be switched to the function-on state with respect to an accepted function and may be switched to the function-pause state with respect to a refused function. When a participant terminal excluding a source sharing terminal becomes the inviting terminal while sharing an audio, screen, and camera function of the source sharing terminal, that is, when a participant terminal excluding the source sharing terminal adds a third terminal, an acceptance may be received from the original sharing terminal for a terminal addition. Only when an acceptance is received from the original sharing terminal, the terminal may be added to a corresponding group.

As described above, connection established participant terminals may configure a single group to thereby share a function. However, a number of participant terminals included in a group may be limited for each function of a terminal. When the number of participant terminals is limited and reaches a maximum number of participant terminals, participant terminal of a corresponding group may not add a third terminal anymore.

Multi-function sharing may refer to using a plurality of functions together by sharing the plurality of functions between terminals. To use the plurality of functions in each terminal, screens corresponding to the respective functions may be configured in a layout form. Here, a layout may be displayed on a screen based on a predetermined priority. For example, layouts may be sequentially displayed by overlapping a layout having a relatively higher priority at an upper end of a layout having a relatively lower priority. Accordingly, a layout having a top priority may be activated in response to a touch input of a user. A priority of a layout may be changed based on a setting of the user.

Screens corresponding to the respective functions are configured in a layout form and thus, there may be a function disallowing a multi-function sharing, that is, incapable of being shared with another function. To use a plurality of functions in each terminal, a mutual effect may need to be absent between the plurality of functions. Accordingly, the multi-function sharing may not be performed between functions that are displayed using an opaque screen. For example, the screen sharing function, the camera sharing function, the location sharing function, the video call function, and the control function are displayed using an opaque screen and thus, multi-function sharing may be disallowed between those functions. Multi-function sharing may not be performed between functions displayed using a transparent screen. For example, the sketchy function and the chat function are displayed using a transparent screen and thus, multi-function sharing may be disallowed therebetween. Also, multi-function sharing may not be performed between a plurality of functions including the same function regardless of a screen layout. For example, multi-function sharing may be disallowed between the voice call and the video call including the voice call function, and between the video call and the camera sharing function including a camera image displaying function.

As described above, due to functions in which multi-function sharing is disallowed, the function switching or the function replacement may be performed. For example, when the screen sharing function, the camera sharing function, the location sharing function, and/or the control function disallowing the multi-function sharing with the video call is selected during the video call, the video call may be switched to the voice call. Also, when the sketchy function is selected during a chat, the chat may be terminated and the function replacement may be performed to share only the sketchy function. Here, when another function is selected while using a communication function, for example, voice call and video call chatting, multi-function sharing may be preferentially performed. When a function displayed using an opaque screen is selected during the video call, the video call may be switched to the voice call, which is described above. When another function is selected while using a function excluding the communication function, and when a function having the same priority and thus, disallowing the multi-function sharing is selected, the function being used may be replaced with the selected function.

Meanwhile, when sharing audio during the voice call or the video call, sound of the audio sharing function and voice of the voice call or the video call may be mixed and thereby be transmitted and received.

An agent, for example, an all-IP agent functions to control sharing a plurality of functions, a function replacement or switching, a function termination, and sharing a function between a plurality of terminals, and the like, in order to provide a function sharing service between a plurality of terminals according to the present invention. The agent may provide an icon, a setting menu, and the like, with respect to a variety of functions that may be shared and thereby executed between terminals. The agent may be configured by hardware, software, or combination of hardware and software.

The agent may be executed in response to a touch input of a user on a key or a button for executing the agent. Also, the agent may be executed in response to an operation of a terminal. For example, the agent may be executed in response to the user holding and shaking the terminal or a predetermined gesture or motion of the user.

Figure 2A:
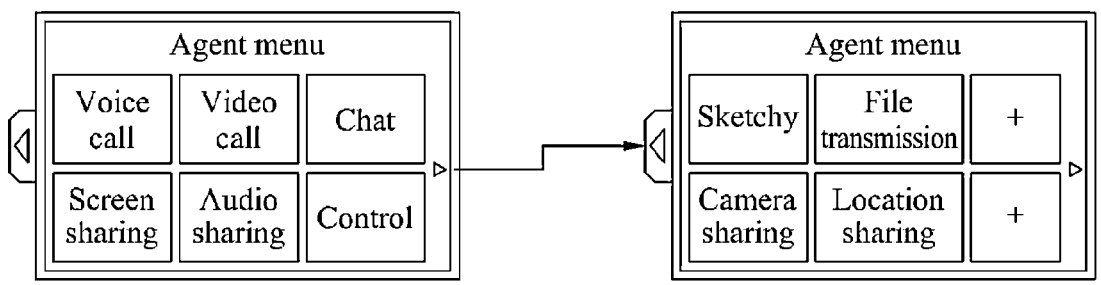
FIGS. 2A through 2C illustrate examples of an agent configured to perform a method of sharing a function between terminals according to an embodiment of the present invention.
Figure 2B:
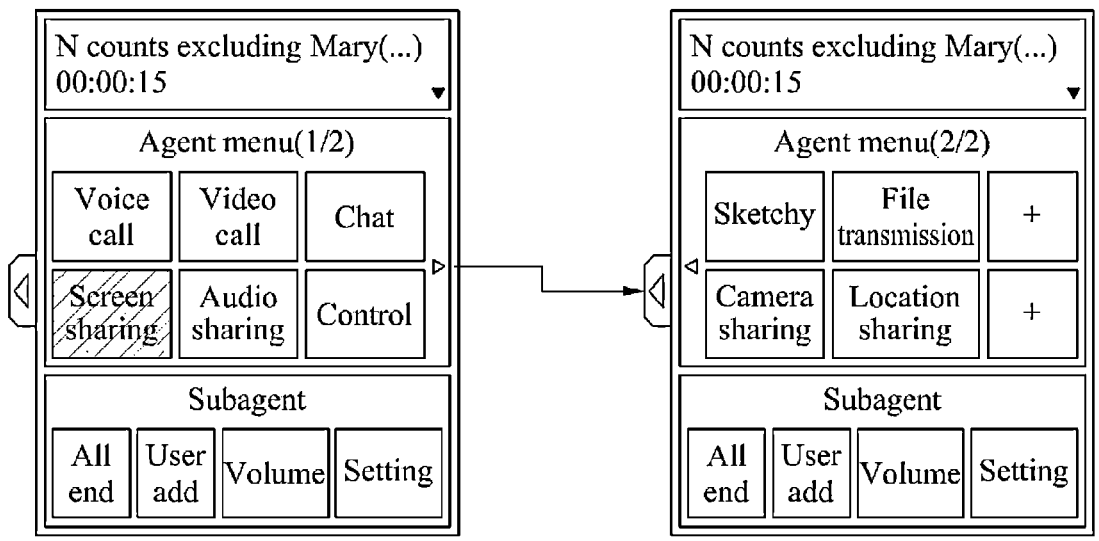
Figure 2C:
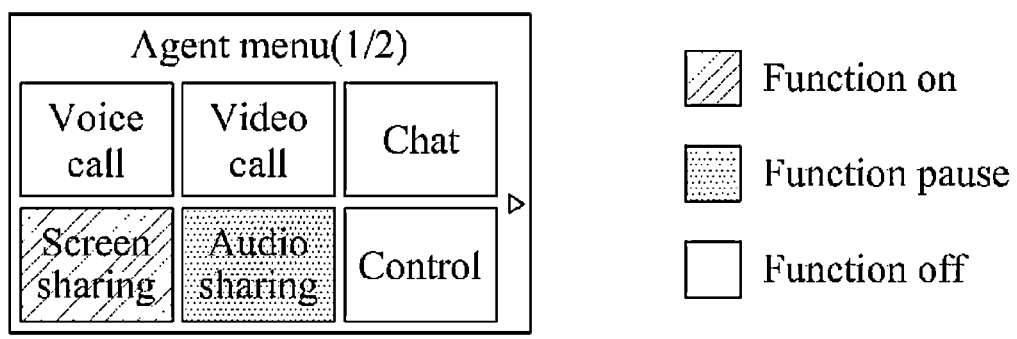

FIGS. 2A through 2C illustrate examples of an agent configured to perform a method of sharing a function between terminals according to an embodiment of the present invention.

FIG. 2A illustrates an agent before a connection between terminals is established to share a function between the terminals. In a standby state, the agent may be output in a pop-up window form in each terminal and may provide functions capable of being shared and thereby executed between participant terminals in a button or icon form.

FIG. 2B illustrates an agent after a connection between terminals is established to share a function between the terminals. In a state in which the connection between the terminals is established, the agent may also be output in a pop-up window form, and may provide functions capable of being shared and thereby executed in a button or icon form. Also, a status bar or a subagent menu may be added to the agent. Referring to FIG. 2B, the status bar is added at an upper end of the agent and the subagent menu is added at a lower end of the agent. The status bar and the subagent menu are described below.

As illustrated in FIGS. 2A and 2B, the agent may be configured using a plurality of windows. In response to an input of a user, the plurality of windows configuring the agent may be switched and thereby displayed. For example, the plurality of windows may be switched in response to a predetermined touch input, for example, a touch and drag input in a horizontal direction or a vertical direction, of the user preset in the agent. Also, a window switching icon such as an arrow indicator may be displayed on the left or the right of the agent. In this case, the plurality of users may be switched in response to a touch input of the user on the window switching icon.

Also, the screen on the right of each of FIGS. 2A and 2B and the agent may include an empty space in addition to a button or an icon associated with functions capable of being shared and thereby executed between participant terminals, and a button or an icon associated with new functions may be added by the user.

FIG. 2C illustrates a button or an icon of a function displayed on an agent window. A color or a pattern of a button or an icon of each function may be displayed differently to indicate a connection state of a terminal with respect to each function.

Figure 3:
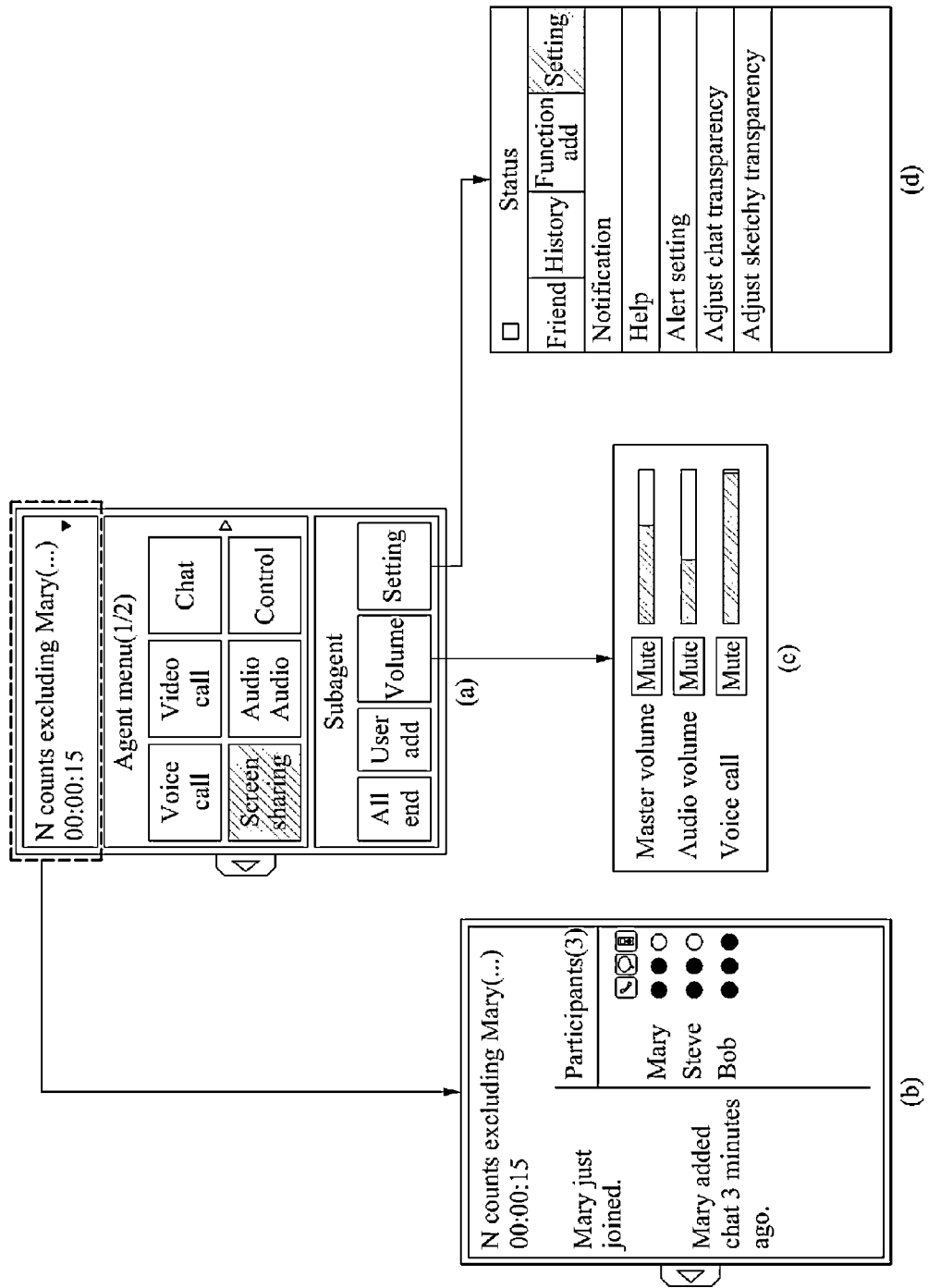
FIG. 3 illustrates an example of an agent configured to perform a method of sharing a function between terminals according to an embodiment of the present invention.

FIG. 3 illustrates an example of an agent configured to perform a method of sharing a function between terminals according to an embodiment of the present invention.

(a) of FIG. 3 illustrates an agent after a connection between terminals is established to share a function between the terminals. A status bar displayed at an upper end of the agent may be open, for example, unfolded in response to an input of a user. For example, the status bar may be open in response to a touch input of the user on the status bar or a touch and drag input of the user in a predetermined direction on the status bar.

Also, a subagent menu displayed at a lower end of the agent may include an all end button of disconnecting a participant terminal with respect to all the functions, a member add button of adding a third terminal excluding current participant terminals to a group including the current participant terminals, a volume button, and a setting button. In response to the member add button selected by the user, an address log configured within the agent to select the third terminal may be connected. A plurality of terminals or users may be selected by the user.

(b) of FIG. 3 illustrates a state in which the status bar is open. The unfolded status bar may display information on each participant terminal being currently connected to share a service, participation time information including a time at which each participant terminal is connected or an amount of time in which each participant terminal is being connected after its participation, current connection state information of each participant terminal, history information on a connection state of each participant terminal, and the like.

(c) of FIG. 3 illustrates a volume control window. When a volume button displayed on the subagent menu of (a) of FIG. 3 is selected by the user, the volume control window may be displayed on the terminal. The user may adjust an audio volume or a voice/video call volume through the volume control window.

(d) of FIG. 3 illustrates a setting menu window. When a setting button displayed on the subagent menu is selected by the user, the setting menu window may be displayed on the terminal. When a function sharing is being performed between terminals, the user may receive a variety of information or change a variety of settings through the setting menu window.

FIGS. 4A through 4D illustrate examples of a setting menu window within an agent according to an embodiment of the present invention.

In response to a setting button selected by the user in (a) of FIG. 3, the setting menu window of FIGS. 4A through 4D may be displayed.

Figures 4A, 4B:
FIGS. 4A through 4D illustrate examples of a setting menu window within an agent according to an embodiment of the present invention.

FIG. 4A illustrates a friend menu in the setting menu window. The friend menu may include a friend address log, and may include a list of friends capable of using a function sharing service. Also, the friend menu may distinguish and thereby include a user currently using the function sharing service and a user not using the function sharing function.

FIG. 4B illustrates a history menu in the setting menu window. The history menu may include a list of users having used the function sharing service so far. When a predetermined user is selected by the user, the history menu may include information on a use history of the function sharing history between the user and the selected user, for example, information on when and which function has been shared.

Figure 4C:
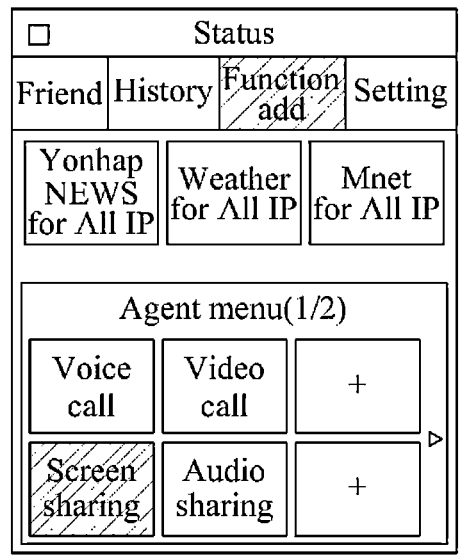

FIG. 4C illustrates a function add menu in the setting menu window. The function add menu may provide information on various functions to add a new function to the empty space of the agent menu in which a function button is not provided. When the user is to add a predetermined function among the various functions provided from the function add menu, the user may select the corresponding function, for example, by touching and dragging the corresponding function button, may add the selected function to the empty space and then share the added function with a participant terminal through the agent.

Figure 4D:
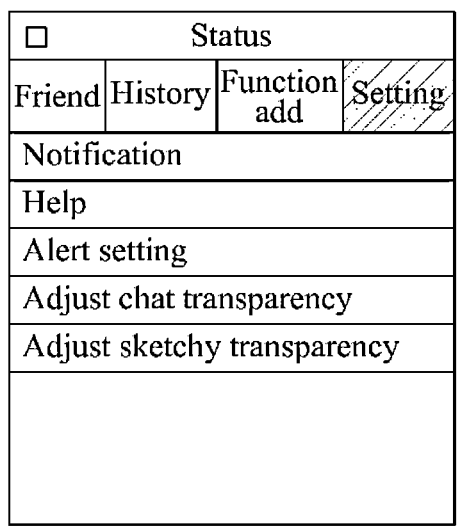

FIG. 4D illustrates a setting menu in the setting menu window. The setting menu may include notifications about a function sharing service or an agent program, help as to how to use the function sharing service, an alert setting to set an alert when a predetermined condition is satisfied, a chat transparency adjustment for adjusting a transparency of a text chat window, a sketchy transparency adjustment for adjusting a transparency of a sketchy window, and the like.

FIG. 5 is a flowchart illustrating a method of sharing a function between terminals according to an embodiment of the present invention.

Referring to FIG. 5, in operation S501, a first terminal may detect an occurrence of an agent call event. That is, when a user performs a touch input on a key or a button for an agent execution, or when the user performs a motion of grasping and shaking the first terminal or performs a predetermined gesture, the first terminal may detect the occurrence of the agent call event.

When the first terminal receives a selection on a first function from a user in a state in which the agent is executed in operation S503, the first terminal may transmit, to a second terminal, a message requesting to share the first function in operation S505.

In operation S507, in response to the message requesting to share the first function from the first terminal, the second terminal may determine whether to accept the request for sharing the first function by displaying a corresponding popup window.

When the second terminal receives a refusal to the request for sharing the first function from a user in operation S507, a procedure of sharing the first function may not be performed anymore and terminated in operation S509.

Conversely, when the second terminal receives an acceptance on the request for sharing the first function from the user in operation S507, the second terminal may transmit, to the first terminal, a confirm message accepting the request for sharing the first function in operation S511.

In operation S513, in response to the confirm message, the first terminal may share the selected first function with the second terminal by establishing a connection with the second terminal. Here, the confirm message may not be transmitted to the first terminal. In this case, in response to an accepting input of the second terminal, the first terminal and the second terminal may automatically share the selected first function. That is, operation S511 may be omitted.

In response to an occurrence of an agent call event detected in operation S515 while sharing the first function with the second terminal, the first terminal may execute the agent. When the first terminal receives a selection on a second function from the user in a state in which the agent is executed in operation S517, the first terminal may transmit, to the second terminal, a message requesting to share the second function in operation S519.

In operation S521, in response to the message requesting to share the second function from the first terminal, the second terminal may determine whether to accept the request for sharing the second function by displaying a corresponding popup window.

When the second terminal receives a refusal to the request for sharing the second function from the user in operation S521, the second terminal may not perform a procedure of sharing the second function and may maintain sharing only the first function with the first terminal in operation S523.

Conversely, when the second terminal receives an acceptance on the request for sharing the second function from the user in operation S521, the second terminal may transmit, to the first terminal, a confirm message accepting the request for sharing the second function in operation S525.

In response to the confirm message, the first terminal may share the selected first function and second function with the second terminal in operation S527. Here, the confirm message may not be transmitted to the first terminal. In this case, in response to an accepting input of the second terminal, the first terminal and the second terminal may share the selected first function and second function. That is, operation S525 may be omitted.

Figure 6:
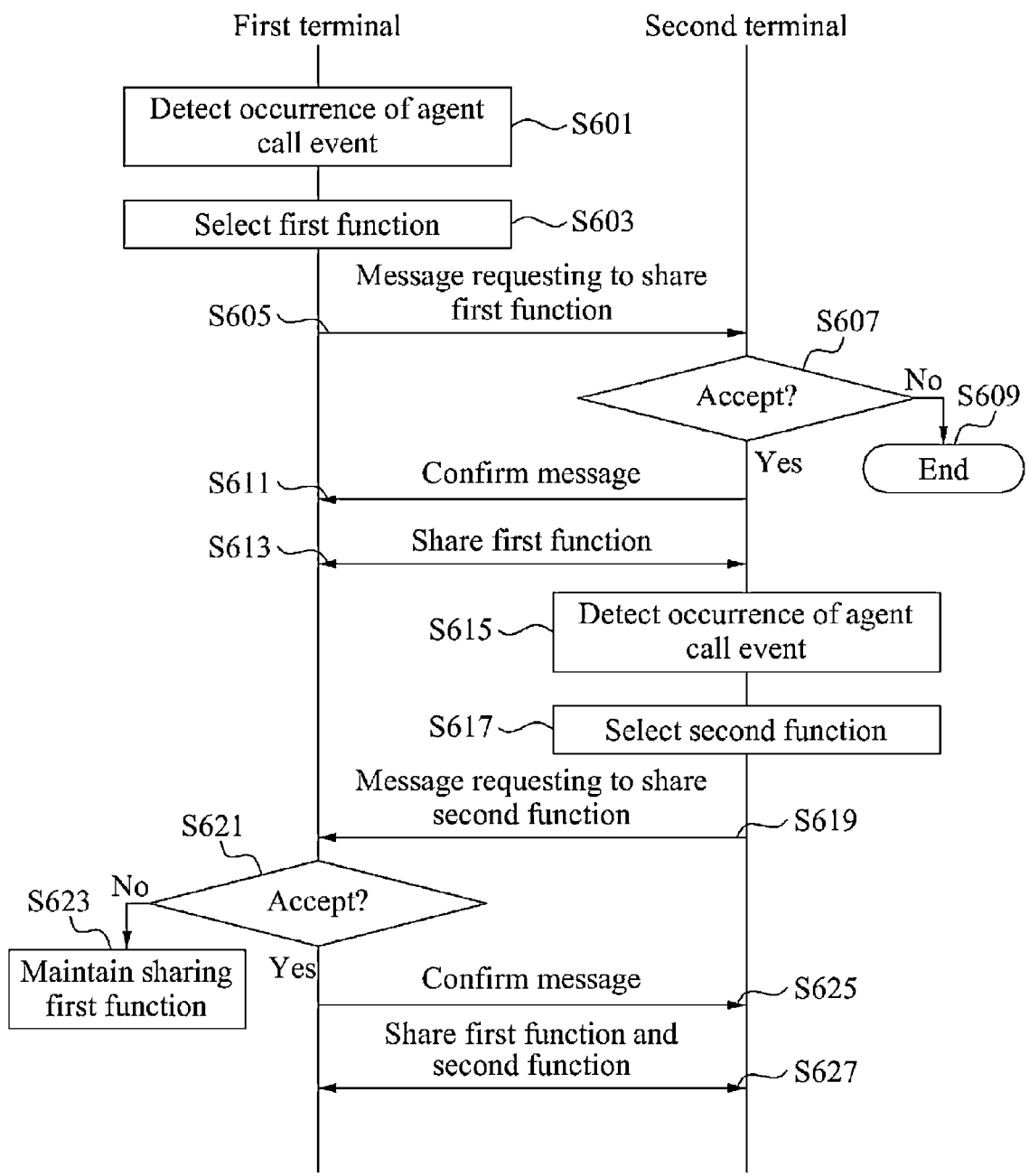
FIG. 6 is a flowchart illustrating a method of sharing a function between terminals according to an embodiment of the present invention.

FIG. 6 is a flowchart illustrating a method of sharing a function between terminals according to an embodiment of the present invention.

Referring to FIG. 6, in operation S601, a first terminal may detect an occurrence of an agent call event. That is, when a user performs a touch input on a key or a button for an agent execution, or when the user performs a motion of grasping and shaking the first terminal or performs a predetermined gesture, the first terminal may detect the occurrence of the agent call event.

When the first terminal receives a selection on a first function from a user in a state in which the agent is executed in operation S603, the first terminal may transmit, to a second terminal, a message requesting to share the first function in operation S605.

In operation S607, in response to the message requesting to share the first function from the first terminal, the second terminal may determine whether to accept the request for sharing the first function by displaying a corresponding popup window.

When the second terminal receives a refusal to the request for sharing the first function from a user in operation S607, a procedure of sharing the first function may not be performed anymore and terminated in operation S609.

Conversely, when the second terminal receives an acceptance on the request for sharing the first function from the user in operation S607, the second terminal may transmit, to the first terminal, a confirm message accepting the request for sharing the first function in operation S611.

In operation S613, in response to the confirm message, the first terminal may share the selected first function with the second terminal by establishing a connection with the second terminal. Here, the confirm message may not be transmitted to the first terminal. In this case, in response to an accepting input of the second terminal, the first terminal and the second terminal may automatically share the selected first function. That is, operation S611 may be omitted.

In response to an occurrence of an agent call event detected in operation S615 while sharing the first function with the first terminal, the second terminal may execute the agent. When the second terminal receives a selection on a second function from the user in a state in which the agent is executed in operation S617, the second terminal may transmit, to the first terminal, a message requesting to share the second function in operation S619.

In operation S621, in response to the message requesting to share the second function from the second terminal, the first terminal may determine whether to accept the request for sharing the second function by displaying a corresponding popup window.

When the first terminal receives a refusal to the request for sharing the second function from the user in operation S621, the first terminal may not perform a procedure of sharing the second function and may maintain sharing only the first function with the second terminal in operation S623.

Conversely, when the first terminal receives an acceptance on the request for sharing the second function from the user in operation S621, the first terminal may transmit, to the second terminal, a confirm message accepting the request for sharing the second function in operation S625.

In response to the confirm message, the second terminal may share the selected first function and second function with the first terminal in operation S627. Here, the confirm message may not be transmitted to the second terminal. In this case, in response to an accepting input of the first terminal, the first terminal and the second terminal may share the selected first function and second function. That is, operation S625 may be omitted.

Figure 7:
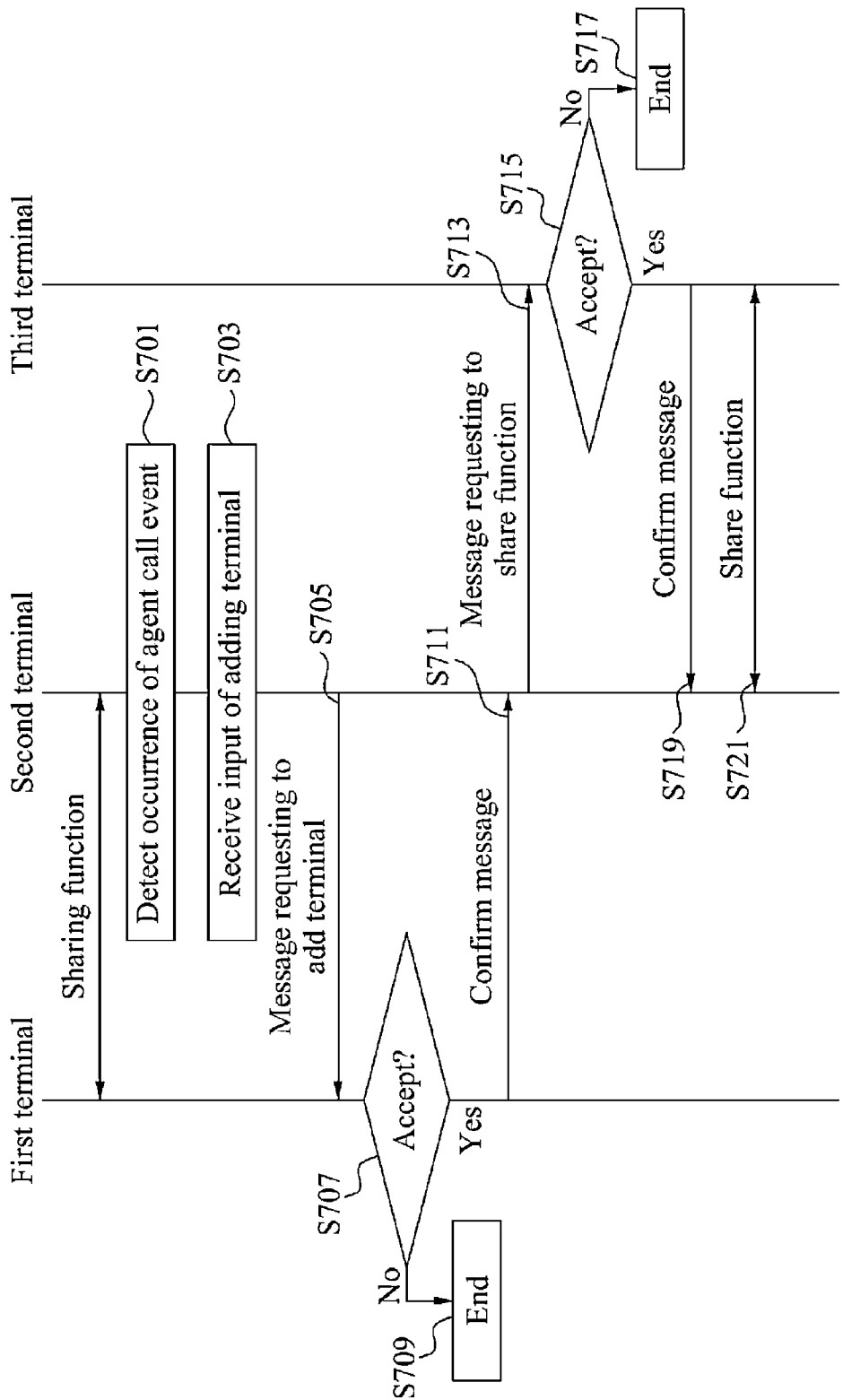
FIG. 7 is a flowchart illustrating a method of sharing a function between terminals according to an embodiment of the present invention.

FIG. 7 is a flowchart illustrating a method of sharing a function between terminals according to an embodiment of the present invention.

Referring to FIG. 7, in operation S701, a second terminal may detect an occurrence of an agent call event while sharing a function with a first terminal. That is, when a user performs a touch input on a key or a button for an agent execution, or when the user performs a motion of grasping and shaking the second terminal or performs a predetermined gesture, the second terminal may detect the occurrence of the agent call event.

When the second terminal receives, from a user, an input of adding a terminal in order to share the function being shared with the first terminal in a state in which an agent is executed in operation S703, the second terminal may transmit, to the first terminal, a message requesting to add the terminal in operation S705.

In operation S707, in response to the message requesting to add the terminal from the second terminal, the first terminal may determine whether to accept the request for adding the terminal by displaying a corresponding popup window.

When the first terminal receives a refusal to the request for adding the terminal from a user in operation S707, a procedure of adding the terminal may not be performed and terminated in operation S709.

Conversely, when the first terminal receives an acceptance on the request for adding the terminal from the user in operation S707, the first terminal may transmit, to the second terminal, a confirm message accepting the request for adding the terminal in operation S711.

In operation S713, in response to the confirm message, the second terminal may transmit, to a third terminal, a message requesting to share the function.

In operation S715, in response to the message requesting to share the function, the terminal may determine whether to accept the request for sharing the function by displaying a corresponding popup window.

When the third terminal receives a refusal to the request for sharing the function from a user in operation S715, the procedure of sharing the function may not be performed and terminated in operation S717.

Conversely, when the third terminal receives an acceptance on the request for sharing the function from the user in operation S715, the third terminal may transmit, to the second terminal, a confirm message accepting the request for sharing the function in operation S719.

In operation S721, in response to the confirm message, the second terminal may share, with the third terminal, the function being shared with the first terminal by establishing a connection with the third terminal. Here, the confirm message may not be transmitted to the second terminal. In this case, in response to an accepting input of the third terminal, the second terminal and the third terminal may automatically share the function shared with the first terminal. That is, operation S719 may be omitted.

Dissimilar to the aforementioned embodiment, when the third terminal receives an acceptance on the request for sharing the function from a user, the third terminal may directly share the function with the first terminal by establishing a connection with the first terminal. In this case, the confirm message may be transmitted from the third terminal to the first terminal in operation S719, and the first terminal may directly share the function with the third terminal in operation S721.

Figure 8:
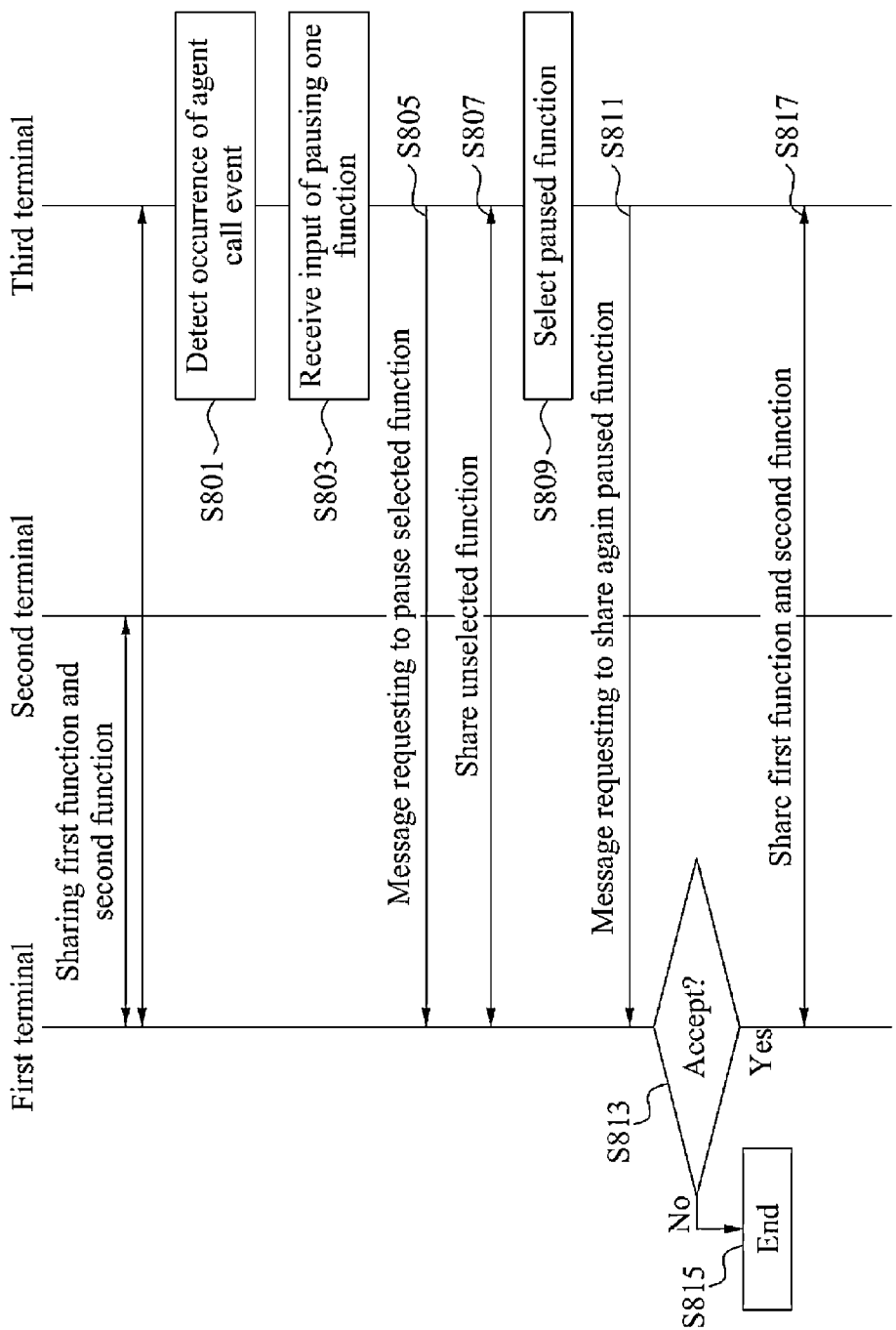
FIG. 8 is a flowchart illustrating a method of sharing a function between terminals according to an embodiment of the present invention.

FIG. 8 is a flowchart illustrating a method of sharing a function between terminals according to an embodiment of the present invention.

Referring to FIG. 8, in operation S801, a third terminal may detect an occurrence of an agent call event while a first terminal is sharing and thereby executing a first function and a second function with a second terminal and the third terminal. That is, when a user performs a touch input on a key or a button for an agent execution, or when the user performs a motion of grasping and shaking the third terminal or performs a predetermined gesture, the third terminal may detect the occurrence of the agent call event.

When the third terminal receives an input of pausing one of the first function and the second function from a user in a state in which the agent is executed in operation S803, the third terminal may transmit, to the first terminal, a message requesting to pause the selected function being shared in operation S805. In operation S807, the first terminal may share only one function unselected by the third terminal.

When the third terminal receives an input of selecting the paused function from the user in order to share again the paused function in operation S809, the third terminal may transmit, to the first terminal, a message requesting to share again the paused function in operation S811.

In operation S813, in response to the message requesting to share again the paused function, the first terminal may determine whether to accept the request for sharing again the paused function by displaying a corresponding popup window.

When the first terminal receives a refusal to the request for sharing again the paused function from a user in operation S813, a procedure of sharing again the paused function may not be performed and terminated in operation S815.

Conversely, when the first terminal receives an acceptance on the request for sharing again the paused function from the user in operation S813, the first terminal may share again the paused function with the third terminal in operation S817. That is, the first terminal may share the first function and the second function with the third terminal.

Figure 9A:
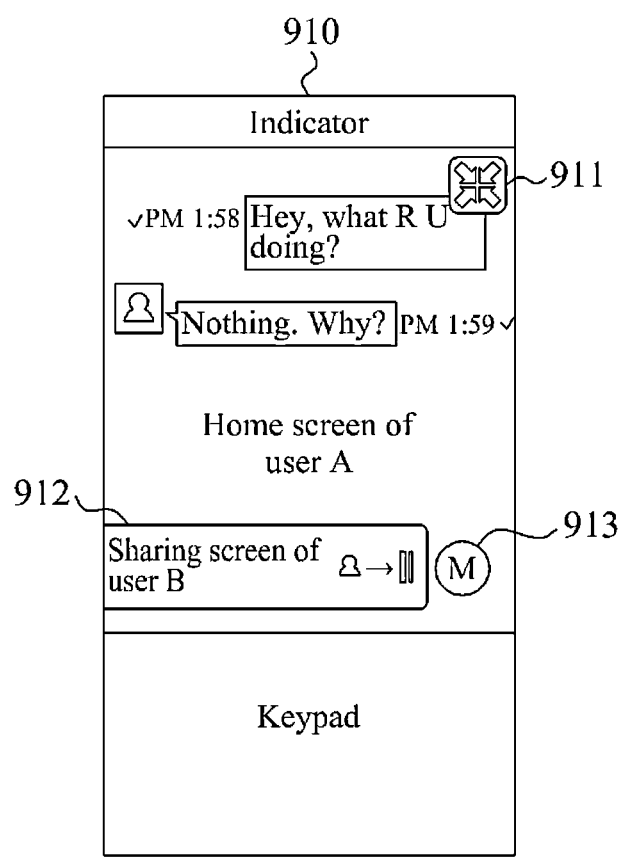
FIGS. 9A and 9B illustrate examples of screens of the respective terminals performing a chat while sharing a screen in real-time according to an embodiment of the present invention.
Figure 9B:
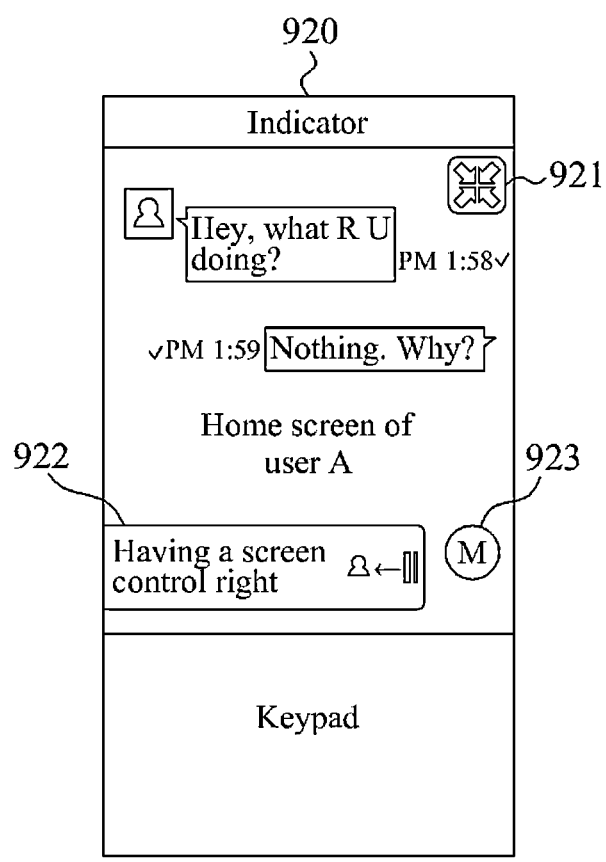

FIGS. 9A and 9B illustrate examples of screens of the respective terminals performing a chat while sharing a screen in real-time according to an embodiment of the present invention.

FIGS. 9A and 9B illustrate a state in which a translucence chat window is displayed during a chat while sharing a screen in real-time. For example, FIG. 9A illustrates a screen 910 of a first terminal and FIG. 9B illustrates a screen 920 of a second terminal.

Referring to FIG. 9, when a connection between the first terminal and the second terminal for real-time screen sharing and chatting is established, a home screen of the first terminal, for example, a home screen of a terminal being shared, a chat window (layer) that overlaps the home screen of the first terminal and displays a chat content, and a virtual keypad window (layer) for a key input of a user may be displayed on the screen 910 of the first terminal and the screen 920 of the second terminal. The chat window to be translucently displayed may refer to a window for classifying, for each terminal, and thereby displaying a chat message (content) input from each terminal performing a chat and a time at which the chat message is input. A terminal may overlap a plurality of layers and thereby output the plurality of overlapping layers on a single screen. In this case, a layer indicating a chat window may be displayed at an upper end of a layer of displaying a shared image. When the connection for real-time screen sharing and chatting is established, a translucent chat window may resume and thereby display a chat content before the connection. That is, the same chat content may be displayed on the chat window before or after the connection. A difference lies in that the chat content is translucently displayed after the connection is established. Here, the home screen or a home screen image may refer to an image in a state in which an application execution screen is not displayed. That is, the home screen may correspond to a screen that is initially displayed when a lock screen is cleared. Also, the home screen may refer to a screen in a state in which an application output image is not displayed even though the application is being executed.

Chat window control icons 911 and 921, sharing state display areas 912 and 922, real-time screen sharing and chatting related icons 913 and 923, and the like, may be displayed on the screen 910 of the first terminal and the screen 920 of the second terminal, respectively. Each of the chat window control icons 911 and 921 functions to display, hide, remove, or not display a translucent chat window on a corresponding terminal screen. That is, in response to a touch input on the chat window control icon 911 or 921 received from a user in a state in which the translucent chat window is displayed, the translucent chat window may be hidden. In response to the touch input received from the user in a state in which the translucent chat window is hidden and thereby not displayed, the translucent chat window may be displayed. Accordingly, the chat window control icons 911 and 921 may be displayed at all times during a chat while sharing a screen between terminals in real-time. Here, when hiding the translucent chat window being displayed, the translucent chat window may be hidden in a form of being rolled in or inserted in a corresponding chat control icon 911 or 921.

Whether a terminal is currently sharing a screen in real-time and a counter party terminal sharing the screen may be displayed on the sharing state display areas 912 and 922 using a text, a sharing state icon, and the like. For example, a state in which a counter party terminal, for example, a second terminal or a user B, is sharing a screen of a first terminal may be displayed on the sharing state display area 912 of the first terminal. Also, the counter party terminal, for example, the second terminal sharing the screen in real-time may have a right to control the sharing screen of the first terminal and thus, whether a right capable of controlling the screen of the first terminal is granted from the first terminal and the corresponding counter party terminal, for example, the first terminal corresponding to the control target may be displayed on the sharing state display area 923 using a text and a sharing state icon. For example, that the second terminal has been granted with the right capable of controlling the screen of the counter party terminal, for example, the first terminal or a user A may be displayed on the sharing state display area 922 of the second terminal. As described above, by displaying a counter party terminal of which a screen is being shared in real-time or is to be controlled, a user may easily recognize the counter party terminal even though a corresponding terminal proceeds with a chat with another terminal, for example, a third terminal excluding the counter party terminal. Also, the sharing state display areas 912 and 922 may be displayed in a form of being folded or open in response to a touch and drag input or a flicking touch input from a user to the left or the right. For example, the examples of FIGS. 9A and 9B correspond to an open state. In a folded state, only the sharing state icon may be displayed.

Each of the real-time screen sharing and chatting related icons 913 and 923 may provide a menu (hereinafter, referred to as a "real-time function sharing and chatting menu" for sharing a function excluding a real-time screen sharing and chatting function or a screen sharing function. That is, in response to a touch input of a user on the real-time screen sharing and chatting related icon 913 or 923, the first terminal or the second terminal may provide a menu for sharing another function during a chat. Here, when the touch input occurs in any one of the first terminal and the second terminal during a chat while sharing the screen in real-time, the corresponding terminal may display the menu and a screen image being shared in real-time may be paused. Alternatively, a last image of the screen image may be displayed as a still image.

The real-time function sharing and chatting menu displayed on the first terminal may include a real-time sharing item including a moving picture sharing function, a news sharing function, a music sharing function, a map sharing function, a photo/image sharing function, and a handwriting-on-screen function, a function of registering a frequently using application and immediately executing the registered application, a function of pausing or resuming a real-time sharing function, a function of capturing a current screen and saving the captured screen in an image file format, a function of performing settings associated with a real-time function sharing and chatting service, for example, controlling a transparency of a translucent chat window, and the like. Also, an image of an icon capable of displaying the above menus may be displayed.

In response to a selection of a user on the moving picture sharing function from the real-time function sharing and chatting menu, the first terminal may execute a moving picture application and may play a moving picture selected by the user. At the same time, the same moving picture application screen of the first terminal may be displayed on the screen of the second terminal. When displaying the moving picture application screen of the first terminal on the screen of the second terminal, the same audio corresponding to the moving picture may also be output on the second terminal in real-time. Also, in response to a selection of the user on the news sharing function, the first terminal may execute an embedded Internet browser application and at the same, the same Internet browser application screen of the first terminal may be displayed on the screen of the second terminal. Also, in response to a selection of the user on the music sharing function, the first terminal may execute an embedded music playback application, and at the same time, the same music playback application screen may be displayed on the screen of the second terminal. When the first terminal plays back music selected by the user, the same audio being played back on the first terminal may be transferred to the second terminal and thereby output in real-time. Also, in response to a selection of the user on the map sharing function, the first terminal may execute an embedded map application and the same map application screen of the first terminal may be displayed on the terminal of the second terminal. Also, in response to a selection of the user on the photo/image sharing function, the first terminal may execute an embedded gallery application and at the same time, the same gallery application screen of the first terminal may be displayed on the terminal of the second terminal. Also, in response to a selection of the user on the handwriting-on-screen function, the first terminal may execute an embedded or newly installed sketchy application and at the same time, the same sketchy application screen of the first terminal may be displayed on the terminal of the second terminal. The same video in which handwriting on a screen is being performed through an input such as a touch and a drag in the first terminal or the second terminal may be displayed on the screen of the first terminal and the screen of the second terminal in real-time. Content varying in response to an input or a manipulation of the user may be transferred from the first terminal to the second terminal. Accordingly, the same content may be displayed on the screen of the second terminal.

The real-time function sharing and chatting menu displayed on the second terminal may include a function of requesting a right capable of controlling the screen of the first terminal, a function of adjusting a screen being shared compared to a size of the screen of the second terminal, for example, a function of adjusting a resolution or a size of a screen image being shared to fully fit for the current screen size of the second terminal or to be the same as a resolution or a size of an original image, a function of pausing or resuming a real-time sharing function, a function of capturing a current screen and saving the captured screen in an image file format, a handwriting-on-screen function, a function of performing settings associated with a real-time function sharing and chatting service, for example, controlling a transparency of a translucent chat window, and the like. Also, an image of an icon capable of displaying the above menus may be displayed.

In particular, in response to a selection of a user on the function of pausing or resuming a real-time sharing function, the first terminal or the second terminal may transmit, to a counter party terminal, a message indicating pausing the real-time sharing function and in response thereto, both terminals may pause the real-time sharing function. That is, when the first terminal receives a selection on the corresponding function or receives the corresponding message from the second terminal, the first terminal may pause a transmission of a screen image being transmitted to the second terminal in real-time. Next, when the terminal having received the selection on the function of pausing the real-time sharing function, for example, the first terminal or the second terminal receives a selection on the function of resuming the paused real-time sharing function, the corresponding terminal may transmit a message indicating resuming the paused real-time sharing function and in response thereto, both terminals may resume the real-time sharing function. In this case, as described above, a procedure of verifying a terminal that is available for a real-time sharing and/or a procedure of requesting/accepting the real-time sharing may not be performed. The real-time sharing function may be immediately resumed through the message indicating resuming the paused real-time sharing function.

Figure 10:
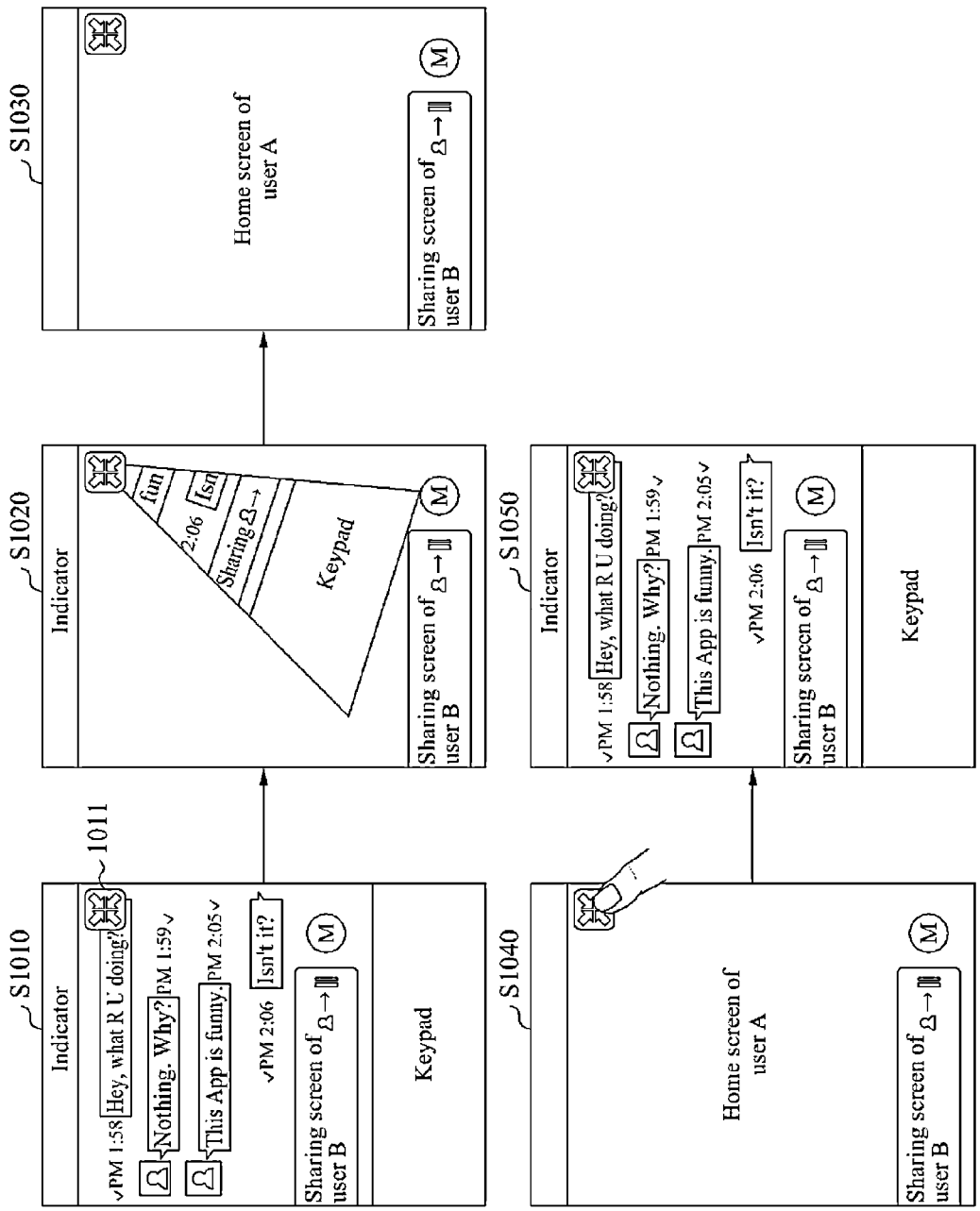
FIG. 10 illustrates an example of a screen of a terminal providing a real-time screen according to an embodiment of the present invention.

FIG. 10 illustrates an example of a screen of a terminal providing a real-time screen according to an embodiment of the present invention.

Referring to FIG. 10, when a connection between a first terminal and a second terminal for a real-time screen sharing and chatting is established, a screen of the first terminal, for example, a home screen being shared, may be displayed on the screen of the first terminal, and a translucent chat window (layer) may be overlapped and thereby displayed on the screen of the first terminal (S1010). In response to a touch input 1011 on a chat window control icon 1010, the whole translucent chat window being displayed on the first terminal may be hidden in a form of being rolled in or inserted in the chat window control icon 1011 (S1020) and the home screen of the first terminal may be displayed in a state in which the translucent chat window is hidden (S1030). Next, in response to a touch input on the chat window control icon 1010 (S1040), the home screen of the first terminal being shared may be displayed again on the screen of the first terminal and the translucent chat window may be overlapped and thereby displayed on the screen of the first terminal (S1050).

Figure 11:
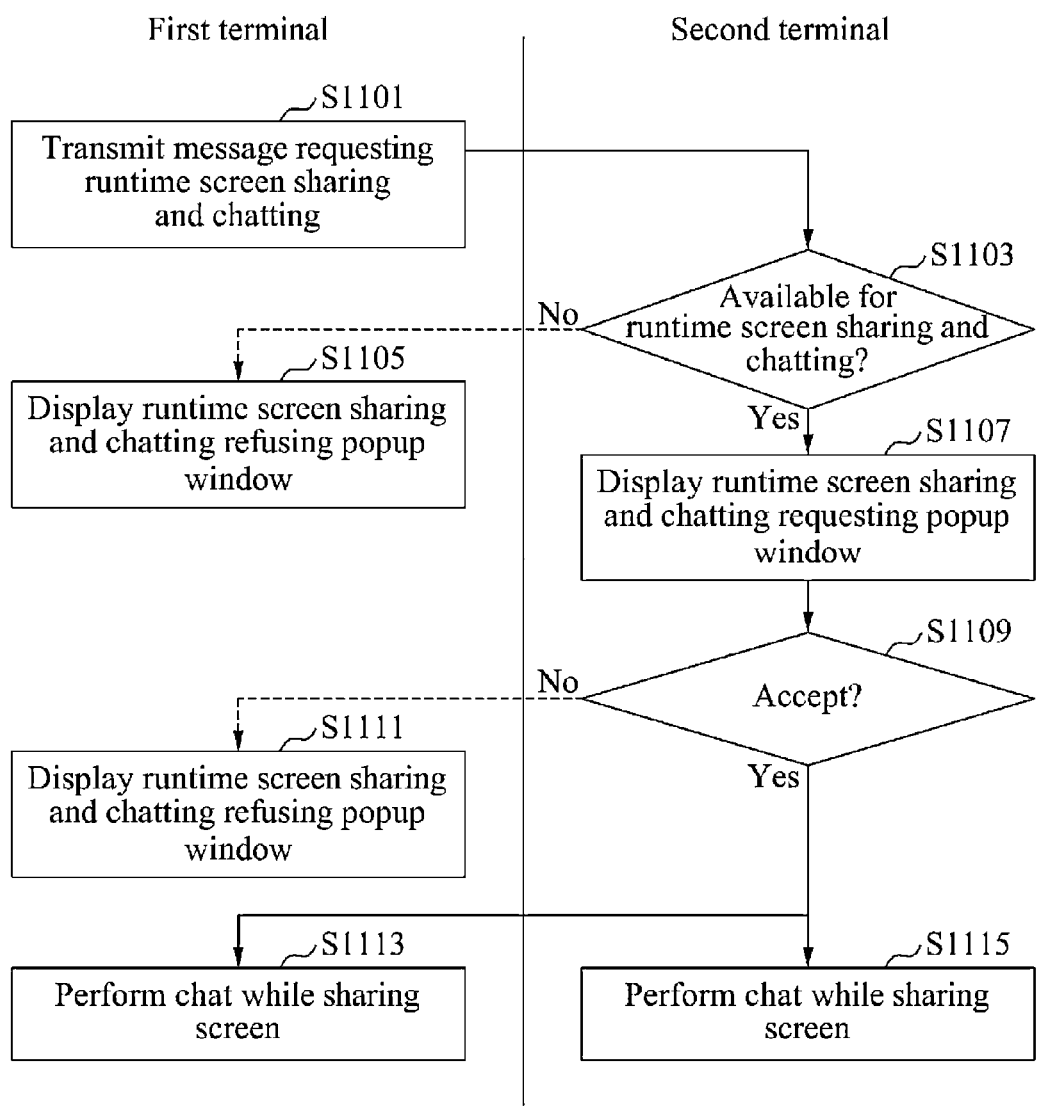
FIG. 11 is a flowchart illustrating a method for real-time screen sharing and chatting according to an embodiment of the present invention.

FIG. 11 is a flowchart illustrating a method for real-time screen sharing and chatting according to an embodiment of the present invention.

Referring to FIG. 11, in operation S1101, a first terminal may transmit, to a second terminal, a message requesting a real-time screen sharing and chatting. Here, when the first terminal and the second terminal perform a chat, that the first terminal requests the second terminal for the real-time screen sharing and chatting may be interpreted as a meaning that the first terminal requests the second terminal to share a screen in real-time. Also, when the first terminal and the second terminal are sharing a screen in real-time, that the first terminal requests the second terminal for the real-time screen sharing and chatting may be interpreted as a meaning that the first terminal requests the second terminal for a chat.

In response to the message requesting the real-time screen sharing and chatting received from the first terminal, the second terminal may determine whether the second terminal is available for the real-time screen sharing and chatting in operation S1103. Here, the second terminal may determine whether the second terminal is available for the real-time screen sharing chatting based on whether an application or a program supporting the real-time screen sharing and chatting is installed in the second terminal.

When the second terminal is unavailable for the real-time screen sharing and chatting in operation S1103, the second terminal may transmit, to the first terminal, a response message indicating that the second terminal is unavailable for the real-time screen sharing and chatting. In response to the response message received from the second terminal, the first terminal may display a real-time screen sharing and chatting refusing popup window in operation S1105. The real-time screen sharing and chatting procedure is terminated.

Conversely, when the second terminal is available for the real-time screen sharing and chatting in operation S1103, the second terminal may display a real-time screen sharing and chatting requesting popup window in operation S1107. After displaying the real-time screen sharing and chatting requesting popup window, the second terminal may receive an input of the user on whether to accept the request for the real-time screen sharing and chatting in operation S1109.

When the second terminal receives, from the user, a refusal to the request for the real-time screen sharing and chatting in operation S1109, the second terminal may transmit, to the first terminal, a response message refusing the request for the real-time screen sharing and chatting. In response to the response message received from the second terminal, the first terminal may display a real-time screen sharing and chatting refusing popup window in operation S1111. The real-time screen sharing and chatting procedure may be terminated.

Conversely, when the second terminal receives, from the user, an acceptance on the request for the real-time screen sharing and chatting in operation S1109, the second terminal may transmit, to the first terminal, a response message accepting the request for the real-time screen sharing and chatting. Accordingly, a connection between the first terminal and the second terminal may be established and the first terminal and the second terminal may perform a chat while sharing the screen of the first terminal in real-time in operations S1113 and S1115. That is, a popup window indicating start of the real-time screen sharing and chatting may be displayed on the screen of each of the first terminal and the second terminal. An image being output on the screen of the first terminal may be transferred to the second terminal in real-time using a streaming method and thereby shared with the second terminal. A chat window of the first terminal and the second terminal may overlap the image being shared and thereby translucently be displayed. As described above, when the first terminal requests the second terminal for the real-time screen sharing and chatting while sharing the screen in real-time, the image being output on the screen of the first terminal is already transferred to the second terminal in real-time using the streaming method and thereby is being shared. Accordingly, a chat window of each of the first terminal and the second terminal may overlap the image being shared and thereby be translucently displayed. Here, an image to be transferred to the second terminal may exclude a chat window and a control menu, such as a menu for indicating an antenna reception intensity, a time, and a residual power, which are output from the first terminal. As described above, when the user of the first terminal manipulates the first terminal, for example, executes a menu and an application while sharing a screen image of the first terminal, a screen varying in response to the manipulation of the user may be shared with the second terminal in real-time.

Operation S1103 may be performed at a service server for supporting the real-time screen sharing and chatting. For example, in operation S1101, the first terminal may transmit, to the service server, a message requesting the real-time screen sharing and chatting and in response thereto, the service server may determine whether the second terminal is available for the real-time screen sharing and chatting. When the service server determines that the second terminal is unavailable for the real-time screen sharing and chatting, the service server may transmit, to the first terminal, a response message indicating that the second terminal is unavailable for the real-time screen sharing and chatting. Conversely, when the service server determines that the second terminal is available for the real-time screen sharing and chatting, the service server may transfer, to the second terminal, a message requesting the real-time screen sharing and chatting received from the first terminal and in response thereto, the second terminal may display a real-time screen sharing and chatting requesting popup window in operation S1107.

Even though a method for real-time screen sharing and chatting is described with reference to FIG. 11 by assuming two terminals, the method for real-time screen sharing and chatting according to the present invention may be performed among two or more terminals. For example, an image being output on a screen of the first terminal may be transferred to a plurality of terminals using a streaming method and thereby be shared in real-time. A chat window between the first terminal and the plurality of terminals may overlap the image being shared and thereby be translucently displayed. In this case, except for a configuration in which the second terminal is configured using the plurality of terminals, the same method as the example of FIG. 11 may be applied. Specifically, in operation S1103, each of a plurality of terminals may determine the availability for the real-time screen sharing and chatting in operation S1103. Alternatively, the service server may determine the availability for the real-time screen sharing and chatting with respect to each of the plurality of terminals. Operation S1109 may be performed only with respect to terminals available for the real-time screen sharing and chatting. Also, in operations S1105 and/or S1111, a corresponding popup window may also display a message associated with the plurality of terminals.

Figure 12:
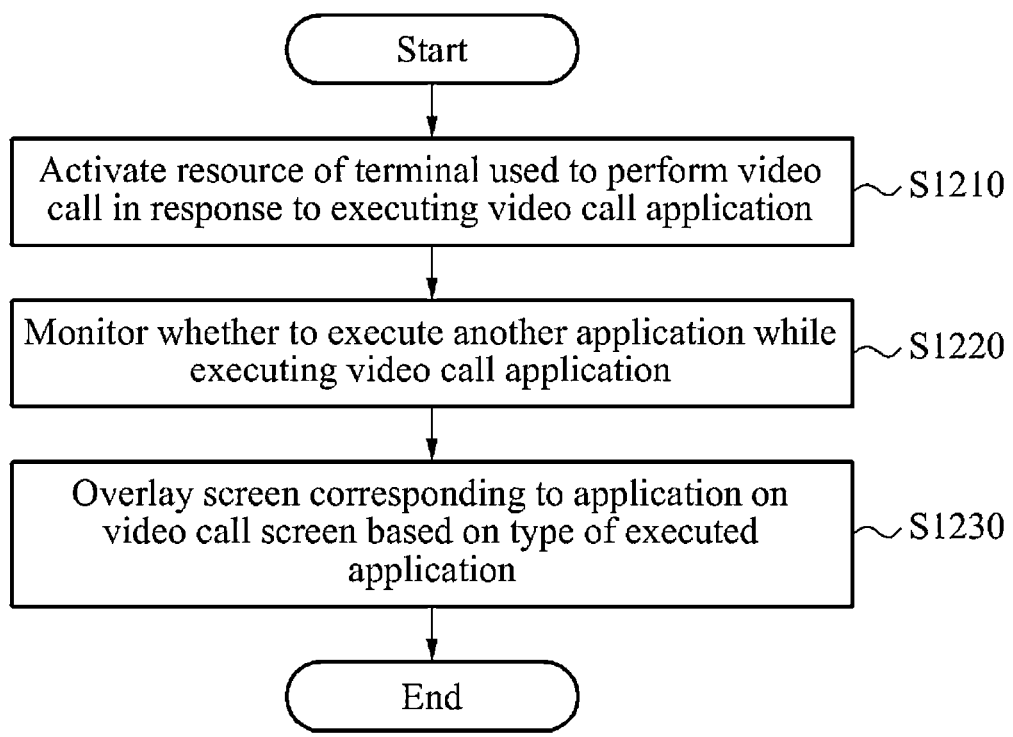
FIG. 12 is a flowchart illustrating a method of displaying an interface of an application during a voice call according to an embodiment of the present invention.

FIG. 12 is a flowchart illustrating a method of displaying an interface of an application during a voice call according to an embodiment of the present invention.

Referring to FIG. 12, in operation S1210, in response to executing a video call application, a resource of a terminal used to perform a video call may be activated.

Operation S1210 may include an operation of receiving, by a terminal, a command to execute the video call application from a user and in response thereto, activating the resource of the terminal used to execute the video call application. Here, the resource of the terminal may include an image sensor, a voice sensor, an image output unit, and a voice output unit.

In operation S1220, whether to execute another application while executing the video call application may be monitored.

Here, the other application may refer to an application, such as a chat application, a photo transmission application, a screen sharing application, a sound sharing application, a location sharing application, and a sketchy application, executed by the user of the terminal during a video call. In particular, the other application may refer to an application for more smoothly performing a communication using the video call. Operation S1220 may include an operation of monitoring whether to execute the other application based on whether the terminal receives the command to execute the other application during the video call.

In operation S1230, a screen corresponding to the application may be overlaid on the video call screen based on a type of the executed application.

The type of the application may include a display characteristic of the application executed during the video call, a transparency of a display, an operation of an interface, an overlay probability with the video call screen, and the like.

Operation S1230 may vary an overlay performing method based on the type of the application. For example, when the display of the application may be displayed transparently and thus, may be overlaid on the video call screen, an application execution screen may be transparently displayed on the video call screen.

The application execution screen overlaid on the screen of the terminal may be modified by a terminal user. For example, in response to dragging the application execution screen, the application execution screen may be rolled up and thus, the video call screen may be clearly disclosed. The rolled-up application execution screen may be processed as a graphic effect on the screen of the terminal in order to inform the above state. For example, the rolled-up application execution screen may be displayed in a form of paper rolled up at an upper end of the terminal screen. The above process may be processed using an animation in order to be intuitively recognized by the user of the terminal.

The rolled-up application execution screen may be open again on the terminal screen through a reverse operation of the terminal user. For example, in response to dragging down the rolled paper form displayed at the upper end of the terminal screen, the application execution screen of the may be open again on the terminal screen in a dragging direction. The above process may be processed using an animation in order to be intuitively recognized by the user of the terminal.

Figure 13:
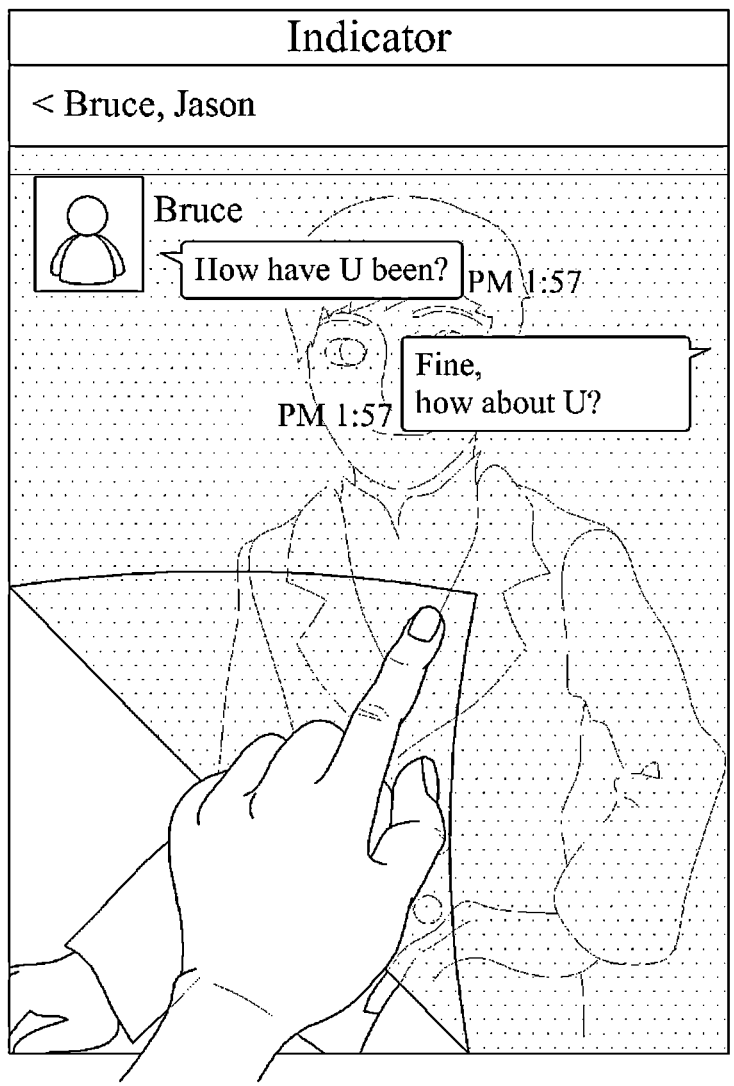
FIG. 13 illustrates an example of a screenshot of a terminal screen displaying a process of rolling up an overlaid chat screen in response to a drag motion.

FIG. 13 illustrates an example of a screenshot of a terminal screen displaying a process of rolling up an overlaid chat screen in response to a drag motion.

Referring to FIG. 13, a translucent chat screen is overlaid on a video call screen and a page at a lower end of the chat screen is dog-eared. A terminal user is dragging the page at the lower end of the chat screen. In response thereto, the translucent chat screen may be rolled up in a dragging direction. The above process may be processed using an animation in order to be intuitively recognized by the user of the terminal.

Figure 14:
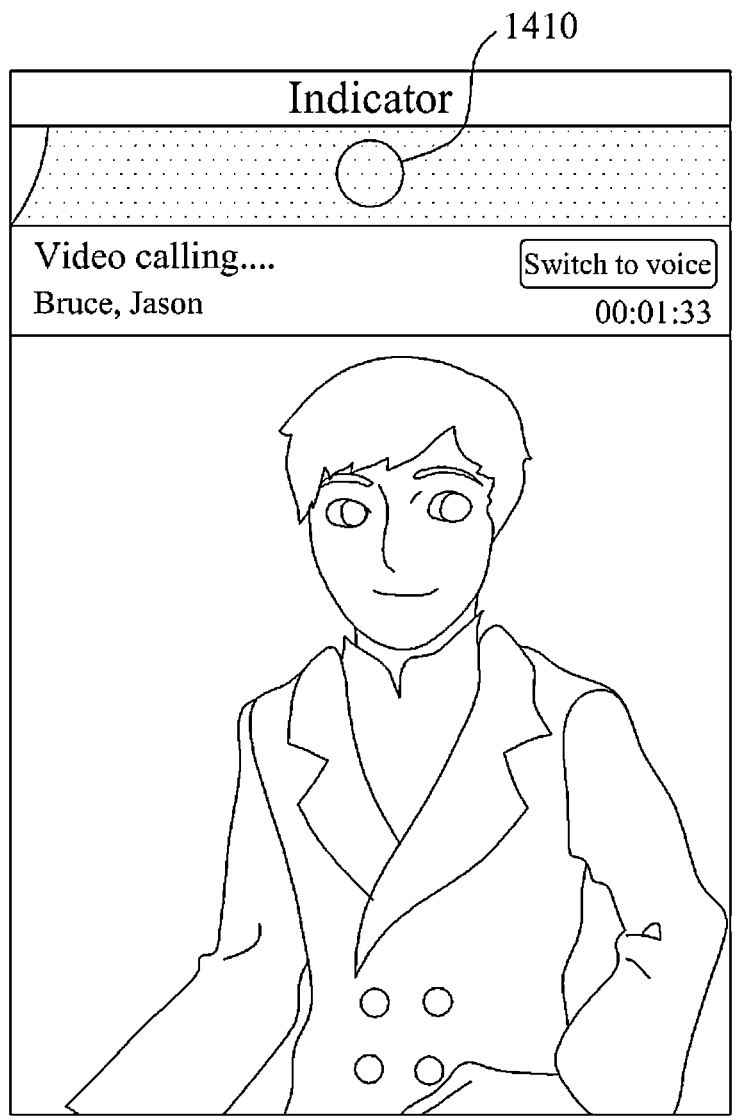
FIG. 14 illustrates an example of a screenshot of a terminal screen on which a rolled-up chat screen is displayed at an upper end of a terminal.

FIG. 14 illustrates an example of a screenshot of a terminal screen on which a rolled-up chat screen is displayed at an upper end of a terminal.

Referring to FIG. 14, a chat screen is displayed at an upper end of a terminal using a graphic effect in a rolled paper form. The rolled paper form is only an example of the graphic effect and thus, may include all the visual processing indicating that the chat screen is compressed on a portion of the terminal screen. To display the chat screen at the upper end in the rolled paper form, the video call screen may be moved to a lower end of the terminal screen. Alternatively, the video call screen may be minified and thereby displayed on a remaining area of the terminal screen excluding the chat screen in the rolled paper form.

When the terminal user opens, for example, unfolds again the rolled-up chat screen, the chat screen may be overlaid on the video call screen in the same form as the previous form before being rolled up and thereby translucently displayed.

Figure 15:
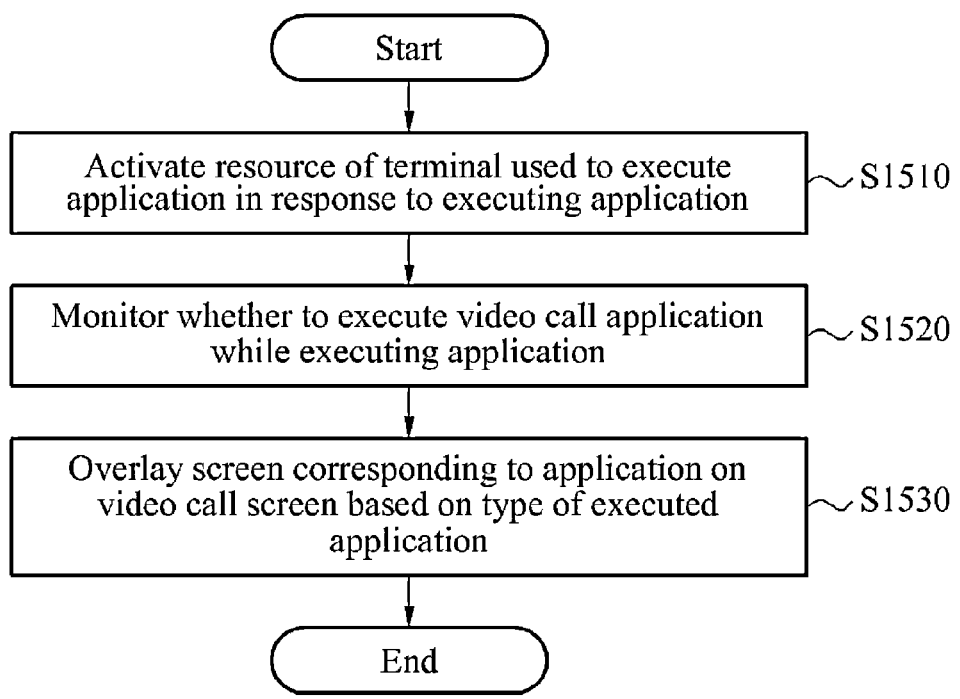
FIG. 15 is a flowchart illustrating a method of displaying an interface of an application during a video call according to an embodiment of the present invention.

FIG. 15 is a flowchart illustrating a method of displaying an interface of an application during a video call according to an embodiment of the present invention.

Referring to FIG. 15, in operation S1510, in response to executing an application, a resource of a terminal used to execute the application may be activated.

Operation S1510 may include an operation of receiving, by a terminal, a command to execute the application from a user and in response thereto, activating the resource of the terminal used to execute the application. Here, the resource of the terminal may include an image sensor, a voice sensor, an image output unit, and a voice output unit.

In operation S1520, whether to execute a video call application while executing the application may be monitored.

Here, the application may refer to an application, such as a chat application, a photo transmission application, a screen sharing application, a sound sharing application, a location sharing application, and a sketchy application. Operation S1520 may include an operation of monitoring whether to execute the video call application based on whether the terminal receives the command to execute the video call application during the execution of the application.

In operation S1530, a screen corresponding to the application may be overlaid on the video call screen based on a type of the executed application.

The type of the application may include a display characteristic of the application executed during the video call, a transparency of a display, an operation of an interface, an overlay probability with the video call screen, and the like. Operation S1530 may vary an overlay performing method based on the type of the application. For example, when the display of the application may be displayed transparently and thus, may be overlaid on the video call screen, an application execution screen may be transparently displayed on the video call screen. A method of controlling the translucently overlaid screen of the application is described with reference to FIG. 12 and thus, a further description related thereto will be omitted here.

Figure 16:
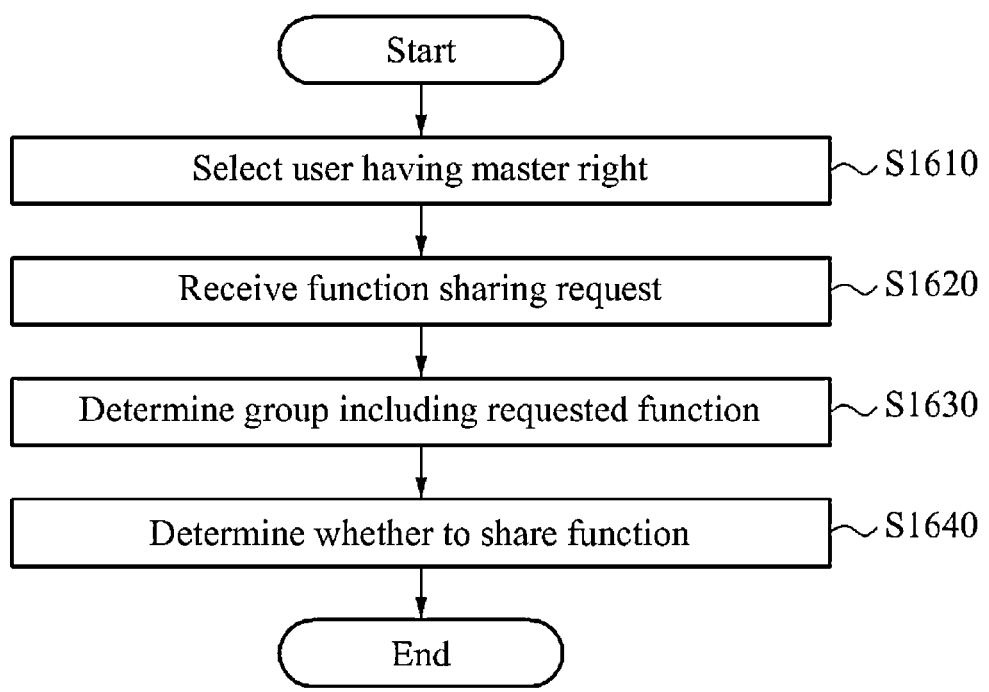
FIG. 16 is a flowchart illustrating a method of sharing a function according to an embodiment of the present invention.

FIG. 16 is a flowchart illustrating a method of sharing a function according to an embodiment of the present invention.

Referring to FIG. 16, in operation S1610, a user having a master right may be selected.

The user having the master right may refer to a user having an exclusive right among a plurality of users having a common connection. The user having the master right may be a user having initiated to share a function with at least two other users, or a user having switched to an 1:N voice call or video call by adding another user during a 1:1 voice call or video call. For example, in a state in which two users are sharing a function, the users may readily add a new function to be shared. In a state in which at least three users are sharing a function, the user having the master right may be designated and a sharing function that may be added by only the user having the master right may be present.

In operation S1620, a function sharing request may be received.

The function sharing may refer to commonly executing a predetermined function between a plurality of users. For example, the function sharing may refer to a communication between a plurality of terminals using at least one of a plurality of functions. Here, the plurality of functions may include a voice call function, a video call function, a screen sharing function, a camera sharing function, a sound sharing function, a game function, a sketchy function, a chat function, a location sharing function, a photo/image transmission function, and the like. The plurality of terminals may commonly execute the above functions and may perform a communication in a further developed form using the functions.

The function sharing request may refer to a request for a user to share at least one of the plurality of functions with one or more other users. In response to the function sharing request, a terminal may transmit and receive, to and from the other terminal, data used to share a function designated by the user with the other user designated by the user.

The function sharing request may be performed through a variety of interfaces on a variety of platforms. The user may select another user that the user desires to share a function with through a user interface. A function sharing interface may include sharable functions and a button capable of readily adding a required function. Information on the other user that the user desires to share the function with may be extracted from an address log present in the terminal, and the user may select a target terminal to share the function from a list of other users.

In operation S1630, a group including the function requested to be shared may be determined.

Various functions included in a terminal may be classified into a plurality of groups based on an input/output device required to use a function, a goal of the function, an effect of the function, a situation in which the function is used, and the like. Functions of the terminal may include a voice call function, a video call function, a screen sharing function, a camera sharing function, a sound sharing function, a game function, a sketchy function, a chat function, a location sharing function, a photo/image transmission function, and the like. The aforementioned functions may be grouped into a voice call group, a video call group, a screen sharing group capable of sharing information between a plurality of users using an image input/output device, a camera sharing group, a sound sharing group, a game group, a sketchy group capable of performing a communication based on an image interface, a chat group, a location sharing group, and a photo/image transmission group.

By grouping various functions, it is possible to decrease a confusion occurring due to a plurality of sharing requests, which may be present in a communication among three parties. A request for sharing a function included in a predetermined group may be granted only to a user having a predetermined right. A user that does not have the predetermined right is limited in making a request for sharing a corresponding function. A terminal of the user that does not have the right may be limited in sharing the function because a button of the function is inactivated in a function sharing interface.

A group that includes a predetermined function among a plurality of groups may be determined by referring to a table in which a plurality of functions is classified. In response to a request for sharing the predetermined function from a user, the terminal may determine the group of the predetermined function by identifying the group from the table.

In operation S1640, whether to share the function may be determined.

Whether to share the function may be determined based on a right of the user having made the function sharing request and the group including the requested function. The right of the user having made the function sharing request may be determined based on whether the user has a master right. Whether the user having made the function sharing request may be determined based on whether a condition of granting the master right is satisfied. The master right may be granted to a user having initiated to share a function with at least two users, a user having switched to an 1:N voice call or video call by adding another user during a 1:1 voice call or video call.

Whether to share the function may be determined based on the group that includes the function requested to be shared. A function included in a predetermined group may be allowed to be readily shared without being limited by the right of the user, and may be limited to a sharing request based on the right of the user. For example, in response to a request for sharing a function of a group including the voice call function or the video call function, only the user having the master right may be allowed to share the function. Also, in response to a request for sharing a function of a group including the sketchy function, the function may be allowed to be shared regardless of the right of the user.

Figures 17, 18:
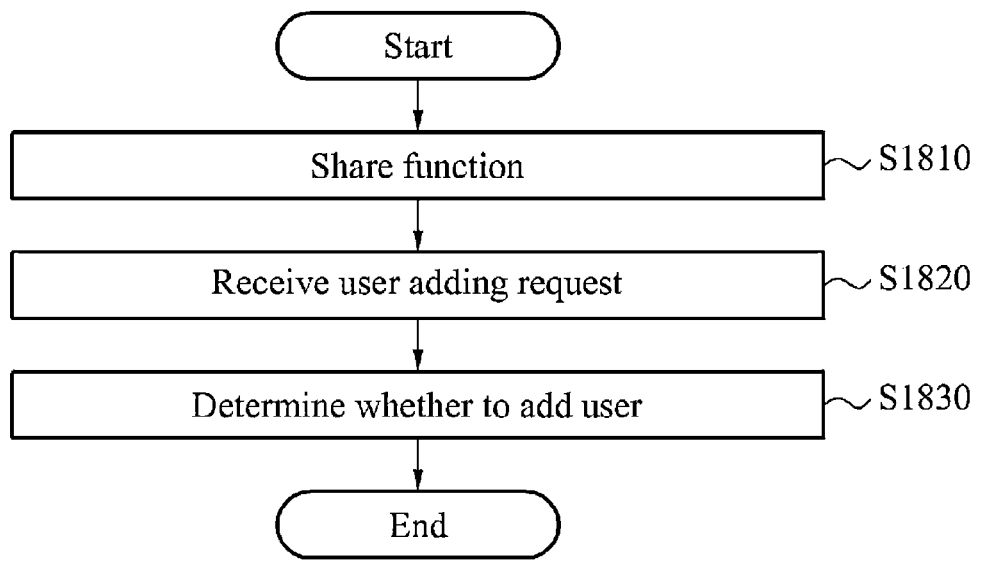
FIG. 17 is a table in which a plurality of functions is grouped.
FIG. 18 is a flowchart illustrating a method of adding a user according to an embodiment of the present invention.

FIG. 17 is a table 1700 in which a plurality of functions is grouped.

Referring to the table 1700 of FIG. 17, a voice call function, a video call function, a screen sharing function, a camera sharing function, a sound sharing function, a game function, a sketchy function, a chat function, a location sharing function, and a photo/image transmission function are grouped into a group A 1710, a group B1720, and a group C 1730. Criteria for grouping may include an input/output device required to use a function, a goal of the function, an effect of the function, a situation in which the function is used, and the like. For example, a plurality of functions may be grouped into a voice call group, a video call group, a screen sharing group capable of sharing information between a plurality of users using an image input/output device, a camera sharing group, a sound sharing group, a game group, a sketchy group capable of performing a communication based on an image interface, a chat group, a location sharing group, and a photo/image transmission group.

By grouping various functions, it is possible to decrease a confusion occurring due to a plurality of sharing requests, which may be present in a communication among three parties. A request for sharing a function included in a predetermined group may be granted only to a user having a predetermined right. A user that does not have the predetermined right is limited in making a request for sharing a corresponding function. A terminal of the user that does not have the right may be limited in sharing the function because a button of the function is inactivated in a function sharing interface.

FIG. 18 is a flowchart illustrating a method of adding a user according to an embodiment of the present invention.

In operation S1810, a plurality of users may be sharing a function. In this state, the function may be shared with another added user. Similar to adding another function in a state in which the plurality of users is sharing a function, the function may be shared with another added user in a state in which the plurality of users is sharing the state.

Operation S1810 may be performed through operations S1610 through S1640 of FIG. 16. Operation S1810 may refer to a state in which the plurality of users is sharing at least one function. For example, when at least three users are already sharing a function, a user having a master right may be present. When a new user is added to share a function while two users are sharing a function, a user having a master right may be determined based on a predetermined criterion. In a state in which two users are sharing a function, each user may readily add a new user to share the function. When at least three users are sharing a function, only the user having the master right may add a new user to share the function.

In operation S1820, a user adding request may be received.

The user adding request may refer to a request for sharing a function with a new user in a state in which a plurality of users is sharing the function. In response to the user adding request, a terminal may transmit and receive, to and from another terminal, data used to add the new user to a current connection in which the plurality of users is performing a communication using at least one function.

In operation S1830, whether to add a user may be determined.

Whether to add a user may be determined based on a right of a user having made the user adding request and a group including a function being shared. The right of the user having made the user adding request may be determined based on whether the user having made the user adding request has a master right. Whether the user having made the user adding request has the master right may be determined based on whether a condition of granting the master right is satisfied. The master right may be granted to a user having initiated to share a function with at least two users, a user having switched to an 1:N voice call or video call by adding another user during a 1:1 voice call or video call.

Whether to add the user may be determined based on the group that includes the function being shared. The group that includes the function being shared may be known through operation S1830 of FIG. 18. In a state in which a function included in a predetermined group is being shared, a new user may be readily added without being limited by the right of the user or may be limited in being added based on the right of the user. For example, in response to the user adding request in a state in which a function belonging to a group including a voice call function or a video call function is being shared, only a user having a master right may be allowed to add a new user. In response to the user adding request in a state in which a function belonging to a group including a sketchy function is being shared, the user addition may be allowed regardless of the right of the user. However, in the case of an 1:N function sharing, only the user having the master right may add a user.

On the contrary to a case in which a user sharing a function adds a new user, the new user may request users sharing the function to allow the new user to share the function. For example, another user may request two users executing a screen sharing function to allow the other user to share the screen sharing function.

Figure 19:
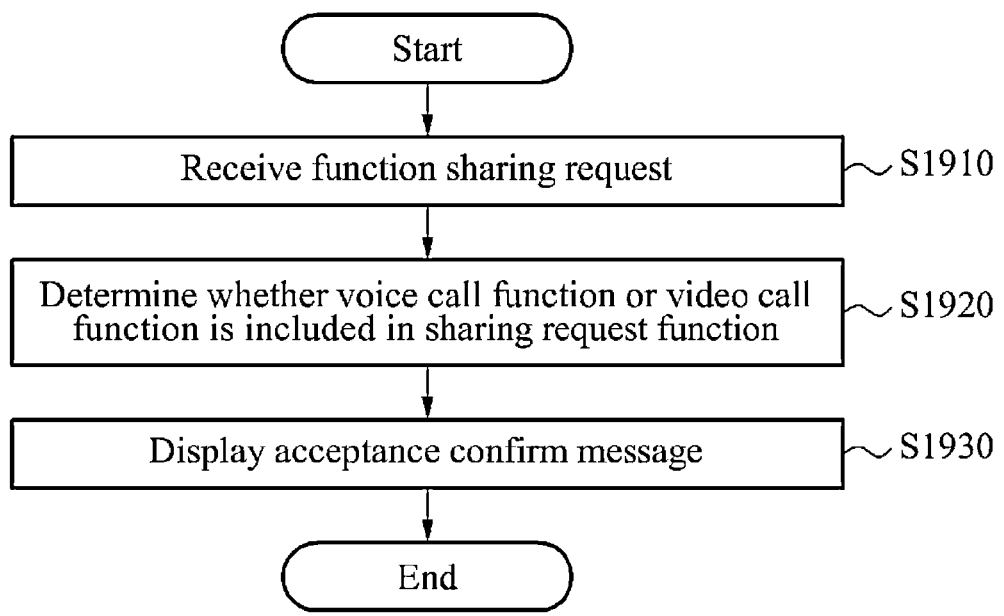
FIG. 19 is a flowchart illustrating a method of sharing a plurality of functions including a voice call function or a video call function.

FIG. 19 is a flowchart illustrating a method of sharing a plurality of functions including a voice call function or a video call function.

In operation S1910, a function sharing request may be received.

The function sharing request may refer to a request for allowing a user to share at least one of a plurality of functions with at least one other terminal user. In response to the function sharing request, a terminal may transmit and receive, to and from another terminal, data used to share a function designated by the user with another user designated by the user.

The function sharing request may be performed on a variety of mobile platforms using a variety of interfaces. A user may select another user that the user is to share a desired function with using a user interface. A function sharing interface may include functions to be shared, and may include a button for adding a required function. The user may extract, from an address log present in the terminal, information on the other user that the user is to share the function with, and may select a target terminal to share the function from a list of other users.

In operation S1920, whether a voice call function or a video call function is included in the sharing request function may be determined.

When at least two functions are to be shared, whether the voice call function or the video call function is included in a function to be shared may need to be determined. When the voice call function or the video call function is included in the function to be shared, whether other functions are to be shared may be determined based on whether an acceptance on sharing the voice call function or the video call function is received. Accordingly, when at least two functions are to be shared, whether the voice call function or the video call function is included in the sharing request function may be determined.

In operation S1930, an acceptance confirm message inquiring about whether to accept a sharing request may be displayed.

In operation S1930, an acceptance confirm message inquiring about whether to share the voice call function or the video call function may be displayed. Only when the voice call function or the video call function is accepted, that is, allowed to be shared, the acceptance confirm message inquiring about whether to accept a request for sharing another function excluding a voice call may be displayed. When the voice call function or the video call function is refused, that is, disallowed to be shared, the function sharing request may be refused without inquiring about whether to accept the request for sharing a function excluding the voice call function or the video call function.

Figure 20:
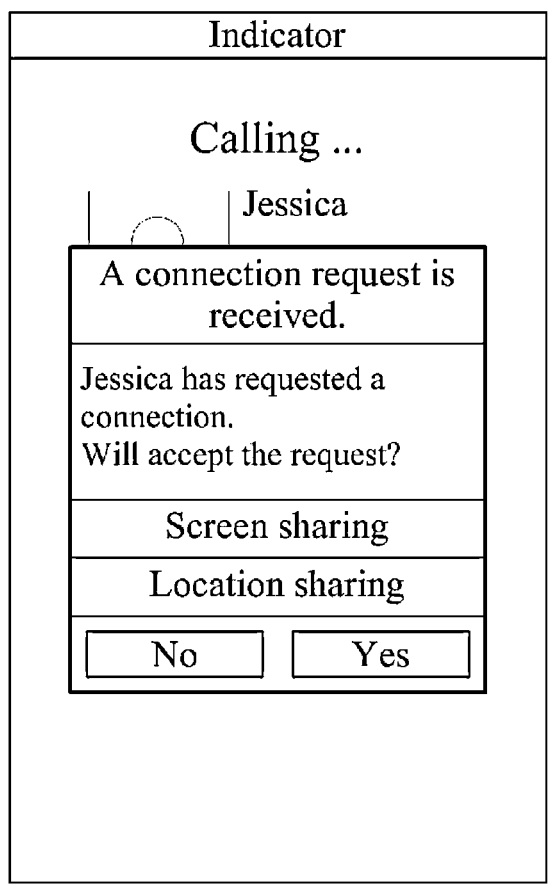
FIG. 20 illustrates an example of a screen displaying a message inquiring about whether to share a voice call function or a video call function in response to a function sharing request for a plurality of functions including the voice call function or the video call function.

FIG. 20 illustrates an example of a screen displaying a message inquiring about whether to share a voice call function or a video call function in response to a function sharing request for a plurality of functions including the voice call function or the video call function.

Referring to FIG. 20, when a request for sharing at least two functions including the voice call function or the video call function is received and the voice call function or the video call function is allowed to be shared, an acceptance confirm message inquiring about whether to allow sharing of other functions may be displayed. FIG. 20 illustrates an example of the acceptance confirm message.

Figure 21:
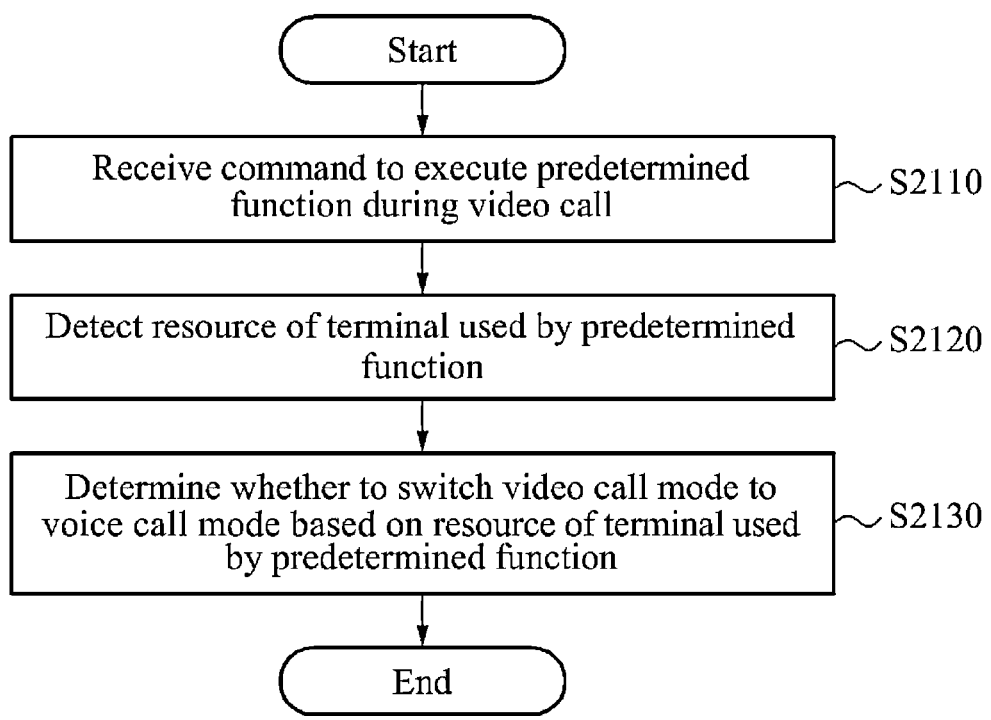
FIG. 21 is a flowchart illustrating a method of switching between a video call and a voice call according to an embodiment of the present invention.

FIG. 21 is a flowchart illustrating a method of switching between a video call and a voice call according to an embodiment of the present invention.

Referring to FIG. 21, in operation S2110, a command to execute a predetermined function during a video call may be received.

Operation S2110 may include an operation of receiving, by a terminal, a command to execute at least one function during a video call between a user of the terminal and a user of another terminal. The predetermined function may refer to a variety of function executable in a smart phone, such as a voice call function, a, a screen sharing function, a camera sharing function, a sound sharing function, a game function, a sketchy function, a chat function, a location sharing function, a photo or image transmission function, and the like Resources of the terminal, such as a display, a speaker, a microphone, and a camera, are used while performing the video call and thus, a method of using terminal resources may be required to execute a predetermined function during a video call.

In operation S2120, a resource of the terminal used by the predetermined function may be detected.

The display, the speaker, the microphone, the camera, and the like of the terminal may be used to execute the predetermined function. The resource of the terminal used by the predetermined function may be detected. For example, the screen sharing function and the chat function may use a display resource of the terminal. In operation S2120, a terminal resource used by the predetermined function to perform the video call may be detected. The video call may use display, speaker, microphone, and camera resources and thus, whether the predetermined function uses the above resources may be detected.

In operation S2130, whether to switch a video call mode to a voice call mode may be determined based on the resource of the terminal used by the predetermined function.

In operation S2130, whether a resource of the terminal used by the predetermined function is identical to a resource of the terminal used by the video call function may be determined. Also, even though a resource of the terminal used by the predetermined function is different from a resource of the terminal used by the video call function, whether the predetermined function and the video call function are allowed to simultaneously use resources of the terminal may be determined.

For example, when the camera sharing function displays an opaque interface on the display of the terminal, the video call function may not use the display resource of the terminal at the same time. Alternatively, when the chat function displays a translucent interface on the display of the terminal, the video call function may use the display resource at the same time.

In operation S2130, whether a resource of the terminal used by the predetermined function is identical to a resource of the terminal used by the video call function may be determined. When a resource of the terminal used by the predetermined function is different from a resource of the terminal used by the video call function, the video call function may be determined to be maintained.

Also, when a resource of the terminal used by the predetermined function is identical to a resource of the terminal used by the video call function and when the predetermined function and the video call function are allowed to use the display resource of the terminal at the same time, the video call function may be determined to be maintained.

Here, when a resource of the terminal used by the predetermined function is identical to a resource of the terminal used by the video call function and when the predetermined function and the video call function are disallowed to use the display resource of the terminal at the same time, the video call function may be determined to be switched to the voice call function.

Figure 22:
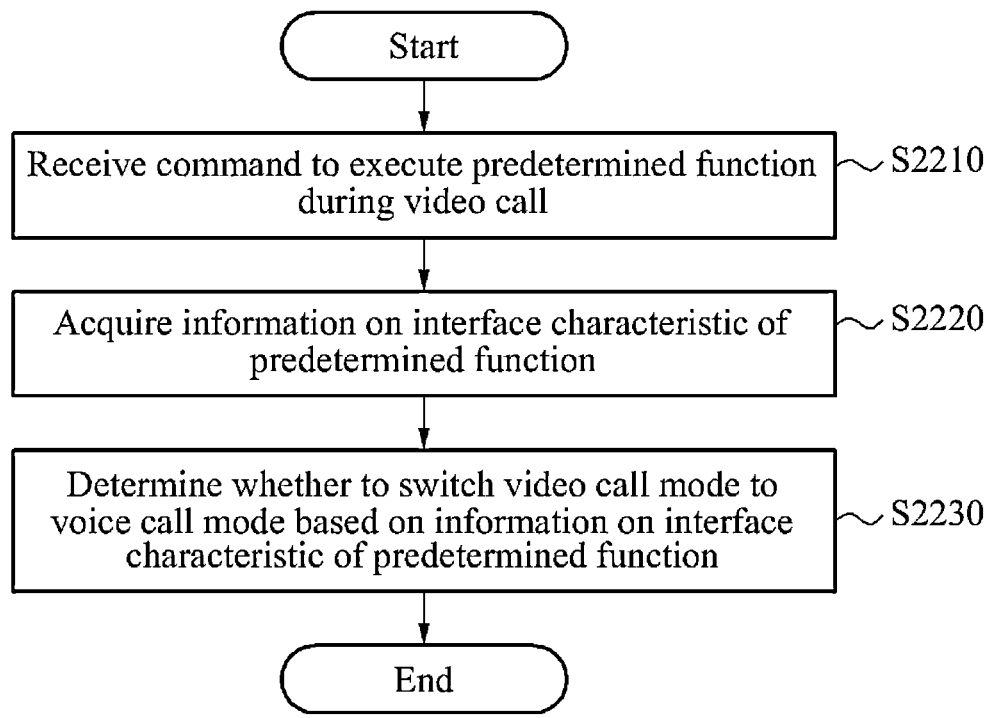
FIG. 22 is a flowchart illustrating a method of switching between a video call and a voice call according to an embodiment of the present invention.

FIG. 22 is a flowchart illustrating a method of switching between a video call and a voice call according to an embodiment of the present invention.

Referring to FIG. 22, in operation S2210, a command to execute a predetermined function during a video call may be received.

Operation S2210 may include an operation of receiving, by a terminal, a command to execute at least one function during a video call between a user of the terminal and a user of another terminal. The predetermined function may refer to a variety of function executable in a smart phone, such as a voice call function, a screen sharing function, a camera sharing function, a sound sharing function, a game function, a sketchy function, a chat function, a location sharing function, a photo or image transmission function, and the like.

In operation S2220, information on an interface characteristic of the predetermined function may be acquired.

Operation S2220 may include an operation of acquiring information on a resource of the terminal used by an interface of the predetermined function. For example, a sound sharing function may use a speaker resource of the terminal, and a camera sharing function may use a camera resource of the terminal. Information on the interface characteristic may be related thereto.

An interface of the predetermined function may use a display, a speaker, a microphone, a camera, and the like of the terminal. The resource of the terminal used by the interface of the predetermined function among the aforementioned resources may be detected. In operation S2220, whether the interface of the predetermined function uses a terminal resource used for the interface of the predetermined function to perform a video call may be detected. The video call may use display, speaker, microphone, and camera resources and thus, whether the interface of the predetermined function uses the above resources may be detected.

Operation S2220 may be an operation of acquiring information on a transparency of an interface for displaying the predetermined function on a screen of the terminal. The above information may be used to determine whether interfaces of a video call screen and the predetermined function may overlap and thereby be displayed on the screen of the terminal.

In operation S2230, whether to switch the video call mode to a voice call mode may be determined based on information on the interface characteristic of the predetermined function.

In operation S2230 whether it is possible to simultaneously display the video call screen and a screen of the predetermined function on the terminal may be determined. For example, when a chat function displays a translucent interface on a display of the terminal, the screen of the video call and the screen of the predetermined function may be simultaneously displayed on the terminal.

When it is possible to simultaneously display the screen of the video call and the screen of the predetermined function on the terminal, the predetermined function may be executed while maintaining the video call. By adjusting a display effect of the video call including the transparency of the interface and a display effect of the predetermined function, it is possible to simultaneously display the screen of the video call and the screen of the predetermined function. When overlapping and thereby translucently displaying the interface of the predetermined function and the screen of the video call on the terminal, the video call may be maintained. Conversely, when it is impossible to simultaneously display the screen of the video call and the screen of the predetermined function on the terminal, the video call may be automatically switched to the voice call.

Figure 23:
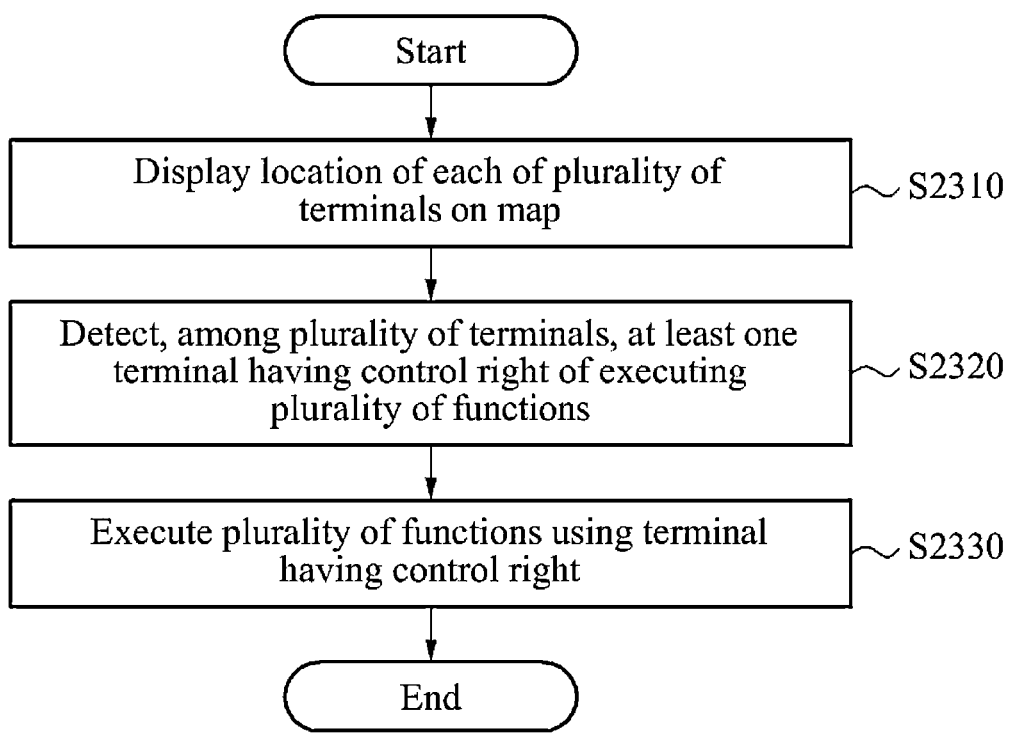
FIG. 23 is a flowchart illustrating an example in which a predetermined user has a control right among a plurality of users in order to execute a plurality of functions at a predetermined point in time when sharing a location between terminals according to an embodiment of the present invention.

FIG. 23 is a flowchart an example in which a predetermined user has a control right among a plurality of users in order to execute a plurality of functions at a predetermined point in time when sharing a location between terminals according to an embodiment of the present invention.

Referring to FIG. 23, a method (hereinafter, a location sharing method) of sharing a location between terminals may include operation S2310 of displaying a location of each of a plurality of terminals on a map provided in each of the plurality of terminals to share a location between the plurality of terminals, and an operation of executing at least one function in response to a request for executing the at least one function among a plurality of functions executable on the map.

In operation S2310, the map may be provided to each terminal through a map application. The plurality of functions may include a function executable while executing a location sharing function. For example, the plurality of functions may include a screen moving function, a map moving function, a target location adding function, a scale change function, and the like.

The operation of executing at least one function requested to be executed may include an operation of changing a scale of the map or moving the map.

The location sharing method may further include an operation of transmitting information on the scale changed map or the moved map to other terminals. At least one terminal may directly transmit information on the scale changed map or the moved map to other terminals. Also, at least one terminal may transmit the information to the other terminals through a server.

For example, when a user A among users of terminals sharing a location is to change a scale of a map, remaining users excluding the user A may not execute a plurality of functions associated with a location sharing function as well as the scale of the map while the user A is changing the scale of the map. That is, the remaining users may be allowed to only view the map changed by the user A.

Also, the operation of executing at least one function requested to be executed may include an operation of adding a target location on the map in response to detecting a gesture on an icon displayed on at least one terminal. Also, when the target location is added on the map, an output message indicating addition of the target location may be displayed on screens of the plurality of terminals.

Also, the operation of executing at least one function requested to be executed may include an operation of activating a trace function in response to detecting a gesture on an icon displayed on at least one terminal, and displaying information on a travel path of each terminal on the map.

The location sharing method may further include an operation of determining a scale of a map based on a location of each terminal. For example, all the users sharing a location may not be displayed on a screen of a user having moved the screen among users of terminals sharing a location. The scale of the map may be set to be automatically changed to be capable of displaying all the users.

The location sharing method may further include operation S2320 of detecting at least one terminal having a control right capable of executing a plurality of functions on the map among the plurality of terminals. Here, in response to a request for executing at least one function, among the plurality of functions executable on the map, received from at least one terminal having the control right, it is possible to execute the requested at least one function in operation S2330.

Figure 24:
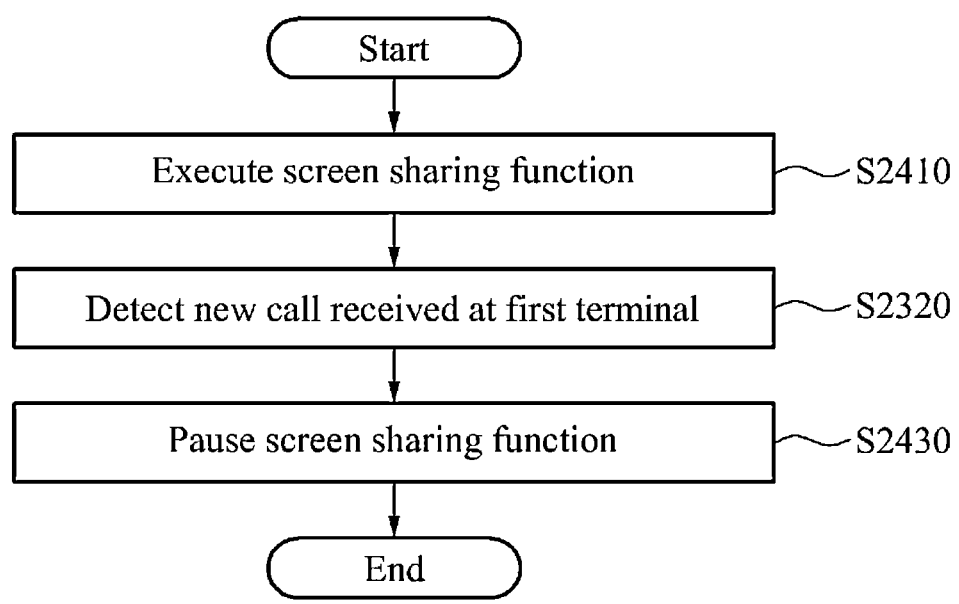
FIG. 24 is a flowchart illustrating a method of pausing a screen sharing function in response to a new call received while sharing a screen between terminals according to an embodiment of the present invention.

FIG. 24 is a flowchart illustrating a method of pausing a screen sharing function in response to a new call received while sharing a screen between terminals according to an embodiment of the present invention.

Referring to FIG. 24, a method (hereinafter, a screen sharing method) of sharing a screen between terminals may include operation S2410 of executing a screen sharing function of a first terminal to share a screen of the first terminal with a second terminal, operation S2420 of detecting a new call received at the first terminal while the screen sharing function of the first terminal is being executed, and operation S2430 of pausing the screen sharing function based on a function corresponding to the new call among a plurality of functions.

In operation S2420, the new call may include a message and a telephone, and may include chat, photo transmission, camera sharing, screen sharing, sound sharing, location sharing, and sketchy functions. The message may include a voice message, a short text message, a long text message, a multimedia message, and a moving picture message. The telephone may include a voice call and a video call.

In operation S2430, in response to the detected new call, a function setting table indicating settings of a user with respect to the plurality of functions may be checked.

For example, when a user A receives a text message from a user C while the user A is sharing a screen with a user B, the user B may become aware of content of the text message received by the user A through screen sharing unless the user A has checked the text message in the function setting table. Conversely, when the user has checked the text message, the screen sharing function may be paused and thus, the user B may be disallowed to view the content of the text message received by the user A.

Operation S2410 may include an operation of providing an interface associated with a plurality of functions in response to detecting a gesture of a user on a displayed icon, and may include an operation of resuming the paused screen sharing function in response to detecting a gesture of the user on the displayed icon while pausing the screen sharing function.

The screen sharing method may further include an operation of displaying an output message indicating pausing the screen sharing function.

Also, the screen sharing method may further include an operation of displaying an output message indicating pausing the screen sharing function on the second terminal in response to pausing the screen sharing function of the first terminal.

Figure 25:
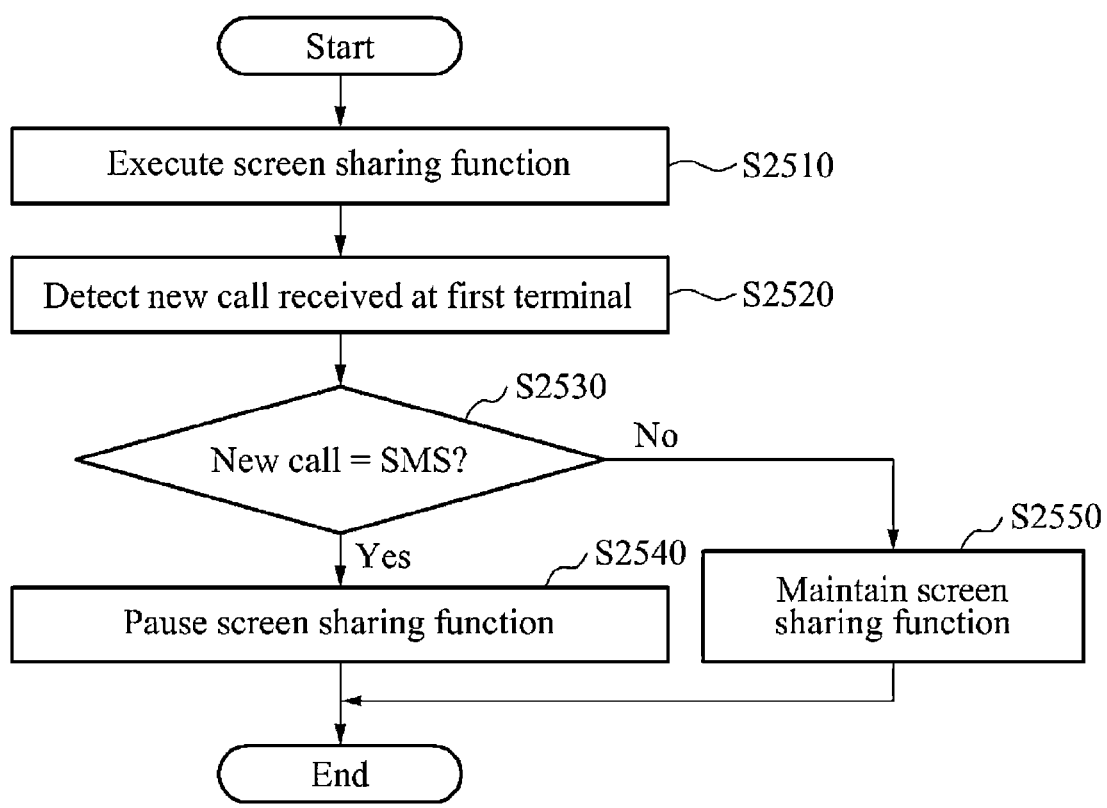
FIG. 25 is a flowchart illustrating a method of pausing a screen sharing function in response to a text message received while sharing a screen between terminals according to an embodiment of the present invention.

FIG. 25 is a flowchart illustrating a method of pausing a screen sharing function in response to a text message received while sharing a screen between terminals according to an embodiment of the present invention.

In operation S2510, a user A may execute a screen sharing function by requesting a user B to share a screen. In operation S2520, while the screen sharing function is being executed, a new call may be received and may be detected at a terminal of the user A. A function corresponding to the new call may be verified from among a plurality of functions.

When the new call corresponds to a short message, whether the new call is a short messaging service (SMS) may be verified based on an assumption that the screen sharing function is paused in operation S2530. When the new call is verified to be the SMS, the screen sharing function may be paused in operation S2540. Conversely, when the new call is verified not to be the SMS, the screen sharing function may be maintained in operation S2550.

When the user A has not checked a message in the function setting table, the screen sharing function may not be paused even though the user A receives the short message.

When a user receives a voice message while the user is using the screen sharing function with another user, a sound sharing function may be paused together with the screen sharing function. Also, the screen sharing function may be maintained while pausing only the sound sharing function.

When a user receives a moving picture message while the user is using the screen sharing function with another user, both the screen sharing function and the sound sharing function may be paused.

Figure 26:
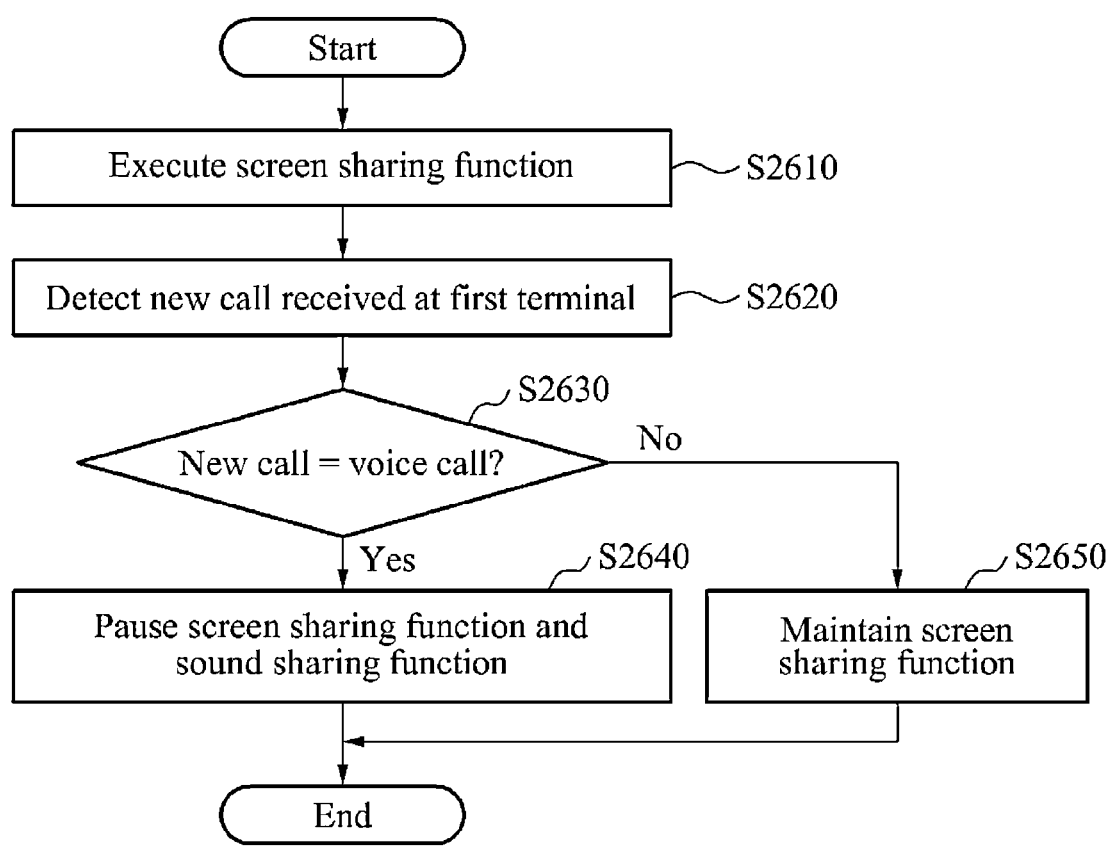
FIG. 26 is a flowchart illustrating a method of pausing a screen sharing function in response to an incoming call while sharing a screen between terminals according to an embodiment of the present invention.

FIG. 26 is a flowchart illustrating a method of pausing a screen sharing function in response to an incoming call while sharing a screen between terminals according to an embodiment of the present invention.

In operation S2610, a user A may execute a screen sharing function by requesting a user B to share a screen. In operation S2620, while the screen sharing function is being executed, a new call may be received and may be detected at a terminal of the user A. A function corresponding to the new call may be verified from among a plurality of functions.

In operation S2630, whether the new call is a voice call may be verified. When the new call is verified to be the voice call, the screen sharing function and the sound sharing function may be paused in operation S2640. When the new call is verified not to be the voice call, the screen sharing function may be maintained in operation S2650.

Once a screen is shared, sound may be basically shared. Accordingly, when a user receives a voice call or a video call, the sound sharing function may need to be paused.

When the user A has not checked the voice call in a function setting table, the screen sharing function and the sound sharing function may not be paused even though the user A receives the voice call.

Figure 27:
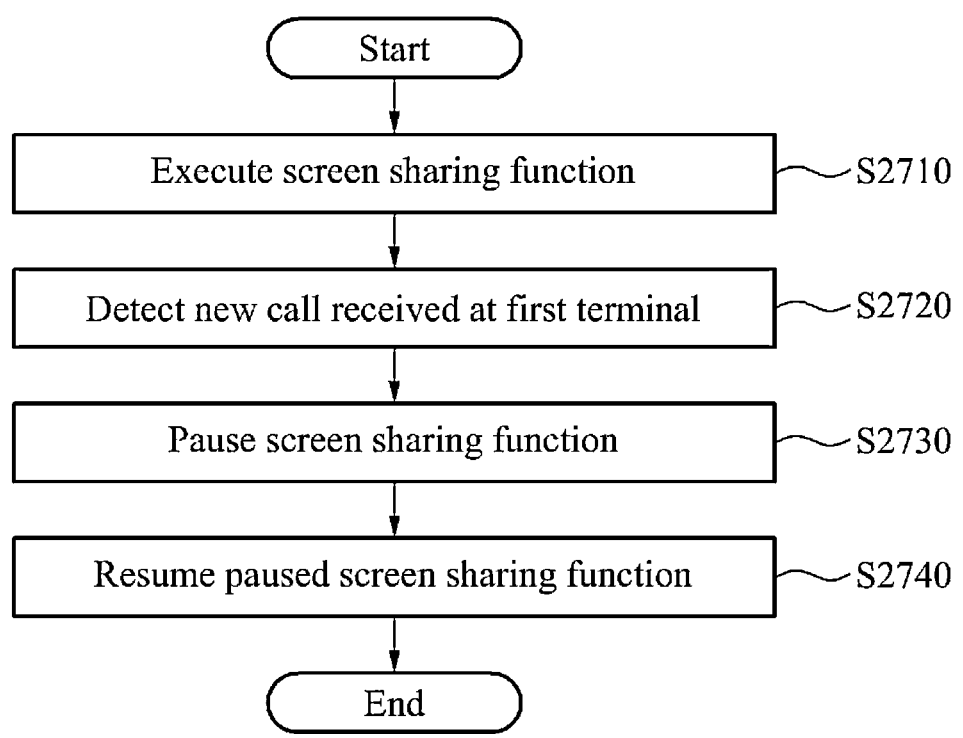
FIG. 27 is a flowchart illustrating a method of resuming the paused screen sharing function between terminals according to an embodiment of the present invention.

FIG. 27 is a flowchart illustrating a method of resuming the paused screen sharing function between terminals according to an embodiment of the present invention.

In operation S2710, a user A may execute a screen sharing function by requesting a user B to share a screen. In operation S2720, while the screen sharing function is being executed, a new call may be received and may be detected at a terminal of the user A. A function corresponding to the new call may be verified from among a plurality of functions. In operation S2730, the screen sharing function may be paused based on the function corresponding to the new call among the plurality of functions.

In operation S2740, in response to detecting a gesture on a displayed icon while pausing the screen sharing function, the paused screen sharing function may be resumed.

For example, the screen sharing function may be paused while the user A is receiving a call. When the user A ends the call, the paused screen sharing function may be resumed. For example, a screen being shared before the user A receives the call may be displayed.

Figure 28:
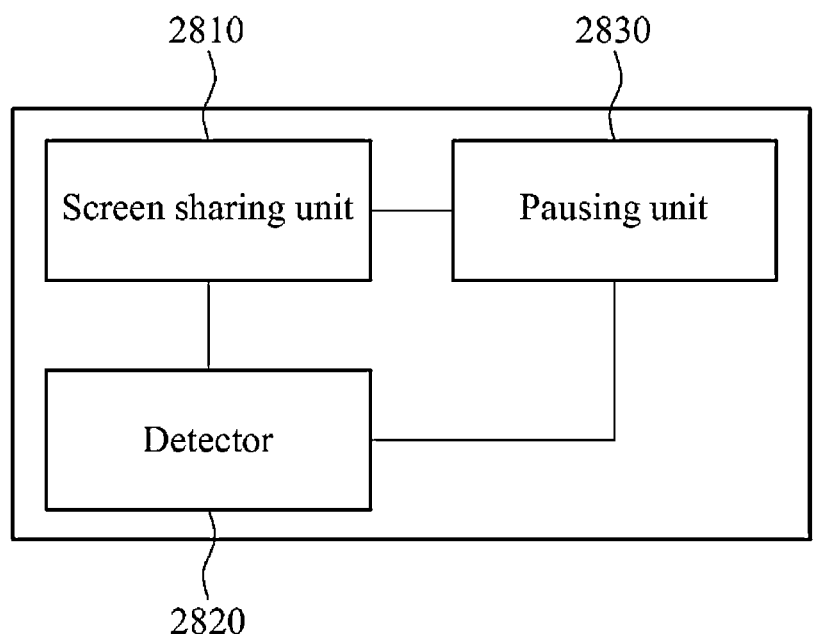
FIG. 28 is a block diagram illustrating an apparatus for pausing a screen sharing function when sharing a screen between terminals according to an embodiment of the present invention.

FIG. 28 is a block diagram illustrating an apparatus for pausing a screen sharing function when sharing a screen between terminals according to an embodiment of the present invention.

Referring to FIG. 28, a first terminal may include a screen sharing unit 2810 configured to share a screen of the first terminal with a second terminal, a detector 2820 configured to detect a new call, and a pausing unit 2830 configured to pause the screen sharing function based on a function corresponding to the new call among a plurality of functions.

The screen sharing unit 2810 may provide an interface associated with the plurality of functions by detecting a gesture of a user on a displayed icon.

The pausing unit 2830 may include a checking unit configured to check a function setting table indicating settings of the user with respect to the plurality of functions in response to detecting the new call.

Figure 29:
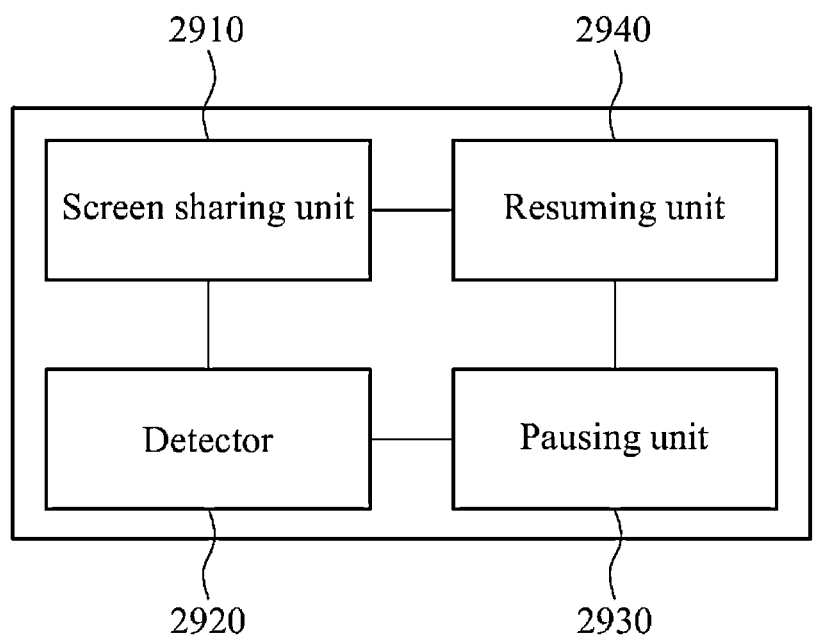
FIG. 29 is a block diagram illustrating an apparatus for resuming the paused screen sharing function between terminals according to an embodiment of the present invention.

FIG. 29 is a block diagram illustrating an apparatus for resuming the paused screen sharing function between terminals according to an embodiment of the present invention.

Referring to FIG. 29, the apparatus for resuming the paused screen sharing function may include a screen sharing unit 2910, a detector 2920, a pausing unit 2930, and a resuming unit 2940 configured to resume the paused screen sharing function in response to detecting a gesture of a user on a displayed icon while pausing the screen sharing function.

The gesture of the user may be a tap, a long tap, a panning, a flicking, a drag-and-drop, and a double tap. The tap may refer to a motion of pushing a predetermined portion of a screen and then releasing. The long tap may refer to a motion of pushing the same portion of the screen for at least a predetermined time, for example, one second. The panning may refer to a motion of moving and then releasing while maintaining a motion of pushing at least two points of the screen. The flicking may refer to a motion of quickly moving two points of the screen and then releasing. The drag-and-drop may refer to a motion of pushing a predetermined portion of the screen for at least a predetermined time, for example, one second, and moving and then releasing while maintaining the pushing operation. The double tap may refer to a motion of pushing the same portion of the screen for at least a predetermined time, for example, one second and then releasing.

Figure 30:
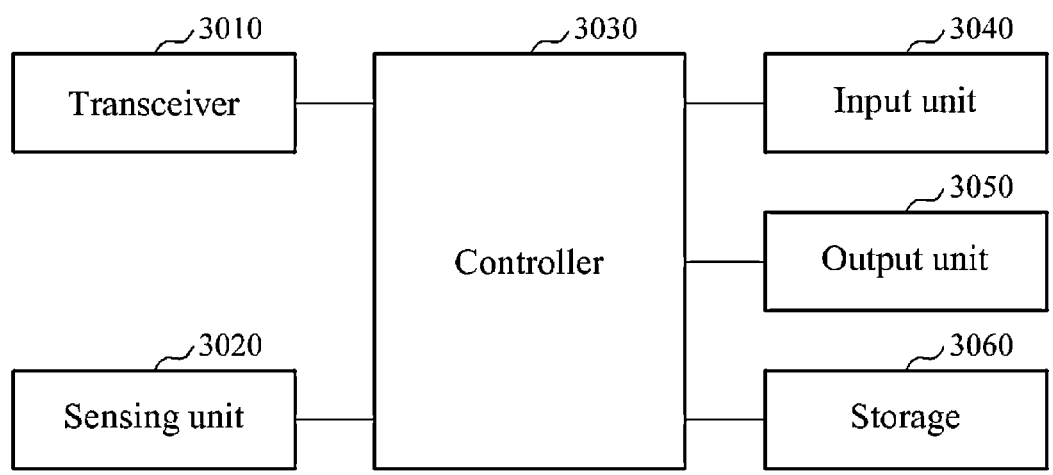
FIG. 30 is a block diagram illustrating a configuration of a terminal according to an embodiment of the present invention.

FIG. 30 is a block diagram illustrating a configuration of a terminal according to an embodiment of the present invention.

Referring to FIG. 30, the terminal may include a transceiver 3010, a sensing unit 3020, a controller 3030, an input unit 3040, an output unit 3050, and a storage 3060. The constituent elements of FIG. 30 are not necessarily required and thus, the terminal may be configured as a server including a more number of constituent elements or a less number of constituent elements.

The transceiver 3010 may include at least one module configured to perform a wired/wireless communication with another terminal. The transceiver 3010 may refer to a short range communication module and the like. The short range communication module may refer to a module configured to perform short range communication with another terminal. A short range communication technology may use near field communication (NFC), Wi-Fi direct, Bluetooth, radio frequency identification (RFID), infrared data association (IRDA), ultra wideband (UWB), ZigBee, and the like.

The sensing unit 3020 may generate a sensing signal to control an operation of the terminal by detecting a current state of the terminal, such as a closing/opening state of the terminal, a location of the terminal, a presence/absence of a user contact, a bearing of the terminal, acceleration/deceleration of the terminal, and the like. In particular, the sensing unit 3020 may include an operational sensor.

The operational sensor may detect a motion of the terminal, a direction oriented by the terminal, a moving direction of the terminal, a speed of the terminal, and the like. Examples of the operational sensor may include a geomagnetic sensor, an acceleration sensor, a gyro sensor, an altimeter, and the like.

The geomagnetic sensor may refer to a sensor capable of detecting a bearing by verifying a flow of a magnetic field, such as a compass. The acceleration sensor may refer to a sensor capable of directly detecting a change in dynamic vibration, for example, acceleration of a sensor vehicle that is configured to specify a physical quantity called a change in a speed. The gyro sensor may refer to a rotational angle acceleration sensor and a sensor capable of sensing a vertical force when a Coriolis force is generated in a vertical direction of a rotational angle, using the same principle as the acceleration sensor. Also, the altimeter may refer to a sensor capable of measuring an atmospheric pressure difference varying based on altitude.

The input unit 3040 may generate input data for a user to control an operation of the terminal. The input unit 3040 may be configured as various types of input devices. For example, the input unit 3040 may include at least one of a keypad, a dome switch, a static/capacitive touch pad, a jog wheel, a jog switch, and a voice input device. Also, the input unit 3040 may function to input an audio signal or a video signal, and may include a camera, a microphone, and the like. The camera may process an image frame, such as a static image or a moving image, acquired by an image sensor in a video call mode or a photographing mode. The processed image frame may be displayed on the output unit 3050. The processed image frame may be stored in the storage 3060, or may be externally transmitted via the transceiver 3010. At least two cameras may be provided based on a use environment.

The microphone may receive an external sound signal via a microphone in a call mode, a recording mode, a voice recognition mode, and the like, and may convert the received sound signal to electrical sound data. In the call mode, the processed sound data may be converted to a form transmittable to a mobile communication base station through a mobile communication module and be output. Various types of noise removal algorithms for removing noise occurring while receiving the external sound signal may be configured in the microphone.

The output unit 3050 may output an operational state of the terminal and an operation result to the user based on a control of the controller 3030. The output unit 3050 may be configured using various types of display devices. For example, the output unit 3050 may be one of a liquid crystal display (LCD), a thin film transistor (TFT)-LCD, a light emitting diodes (LED), an organic light emitting diode (OLED), an active matrix organic light emitting diodes (AMOLED), a flexible display, a three-dimensional (3D) display, and the like.

When the output unit 3050 and a sensor of sensing a touch operation are provided in a layer structure, for example, a touch screen, the output unit 3050 may also be used as an input device in addition to an output device. A touch sensor may be provided in a form of, for example, a touch film, a touch sheet, a touch pad, and the like.

The touch sensor may be configured to convert, to an electrical input signal, a change in pressure applied on a predetermined portion of the output unit 3050 or a change in capacitance occurring in the predetermined portion of the output unit 3050. The touch sensor may be configured to detect a location at which the touch has occurred, an area thereof, and a pressure at which the touch is applied. In response to a touch input on the touch sensor, signals corresponding thereto may be transmitted to the controller 3030. Accordingly, the controller 3030 may verify an area of the output unit 3030 in which the touch input has occurred.

The storage 3060 may refer to a device configured to store a program and data used for an operation of the terminal, and may store an operational program and an application program to be executed by the terminal. The storage 3060 may be configured as various types of storage devices. For example, the storage 3060 may include at least one of storage media provided in a flash memory type, a hard disk type, and a multimedia card micro type, a card type memory, for example, SD or XD memory, random access memory (RAM), static random access memory (SRAM), read only memory (ROM), electrically erasable programmable read only memory (EEPROM), programmable read only memory (PROM), a magnetic memory, a magnetic disk, and an optical disc. The storage 3060 may be provided inside or outside the controller 3030, and may be connected to the controller 3030 using various types of known devices.

The controller 3030 may control an overall operation of the transceiver 3010, the sensing unit 3020, the input unit 3040, the output unit 3050, and the storage 3060, and may configure the functions, processes, and/or methods proposed in FIGS. 1 through 29. The above-described exemplary embodiments of the present invention may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of sharing a function between terminals, the method comprising:
   receiving, by a first terminal, a selection on a first function to be shared with another terminal and thereby executed;
   receiving, by the first terminal, a selection on a second terminal to share and thereby execute the first function;
   transmitting, by the first terminal to the second terminal, a request message requesting to share and thereby execute the first function;
   sharing, by the first terminal, and thereby executing the first function with the second terminal by establishing a wireless communication with the second terminal;
   receiving, by the first terminal from the second terminal, a message requesting adding of a third terminal in order to share and thereby execute the first function;
   transmitting, by the first terminal to the third terminal, a request message requesting to share and thereby execute the first function; and
   sharing, by the first terminal, and thereby executing the first function with the third terminal by establishing a wireless communication with the third terminal.

2. The method of claim 1, further comprising:
   receiving, by the first terminal, a selection on a second function to be executed with the second terminal while sharing and thereby executing the first function with the second terminal,
   wherein the first terminal shares and thereby executes the first function and the second function with the second terminal.

3. The method of claim 1, further comprising:
   receiving, by the first terminal, a selection on a third terminal to share and thereby execute the first function;
   transmitting, by the first terminal to the third terminal, a request message requesting to share and thereby execute the first function; and
   sharing, by the first terminal, and thereby executing the first function with the third terminal by establishing a wireless communication with the third terminal.

4. The method of claim 1, wherein the first function corresponds to any one of a voice call function, a video call function, a screen sharing function of displaying a screen of one terminal to be the same on a counter party terminal, an audio sharing function of outputting sound of one terminal alike to the counter party terminal, a control function of enabling one terminal to remotely control the counter party terminal, a sketchy function of displaying a touch input of one terminal to be the same on the counter party terminal, a file transmission function of transmitting a file of one terminal to the counter party terminal, a camera sharing function of displaying a camera image installed in one terminal to be the same on the counter party terminal, and a location sharing function of displaying a location of one terminal on the counter party terminal.

5. The method of claim 4, wherein the screen sharing function is a function of capturing a screen of one terminal for at least 15 frames per second, compressing an image of the captured screen as a moving picture, and transmitting the moving picture to the counter party terminal.

6. The method of claim 4, wherein the audio sharing function is a function of capturing a sound output from one terminal, compressing the captured sound to an MPEG Audio Layer 3 (MP3) file, and transmitting the MP3 file to the counter party terminal.

7. A method of sharing a function between terminals, the method comprising:
   receiving, by a first terminal, a selection on a second function to be shared and thereby executed while sharing and thereby executing a first function with a second terminal by establishing a wireless communication with the second terminal;
   sharing, by the first terminal, and thereby executing the first function and the second function with the second terminal;
   receiving, by the first terminal from the second terminal, a message requesting adding of a third terminal in order to share and thereby execute the first function and the second function;
   transmitting, by the first terminal to the third terminal, a request message requesting to share and thereby execute the first function and the second function; and
   sharing, by the first terminal, and thereby executing the first function and the second function with the third terminal by establishing a wireless communication with the third terminal.

8. The method of claim 7, further comprising:
   receiving, by the first terminal, a selection on a third terminal to share and thereby execute the first function and the second function;
   transmitting, by the first terminal to the third terminal, a request message requesting to share and thereby execute the first function and the second function; and
   sharing, by the first terminal, and thereby executing the first function and the second function with the third terminal by establishing a wireless communication with the third terminal.

9. A method of sharing a function between terminals, the method comprising:
   receiving, by a first terminal, a selection on a first function and a second function to be shared with another terminal and thereby executed;
   receiving, by the first terminal, a selection on a second terminal to share and thereby execute the first function and the second function;
   transmitting, by the first terminal to the second terminal, a request message requesting to share and thereby execute the first function and the second function;
   sharing, by the first terminal, and thereby executing the first function and the second function with the second terminal by establishing a wireless communication with the second terminal;
   receiving, by the first terminal from the second terminal, a message requesting adding of a third terminal in order to share and thereby execute the first function and the second function;
   transmitting, by the first terminal to the third terminal, a request message requesting to share and thereby execute the first function and the second function; and
   sharing, by the first terminal, and thereby executing the first function and the second function with the third terminal by establishing a wireless communication with the third terminal.

10. The method of claim 9, further comprising:
    receiving, by the first terminal, a selection on a third terminal to share and thereby execute the third function and the second function;
    transmitting, by the first terminal to the third terminal, a request message requesting to share and thereby execute the first function and the second function; and
    sharing, by the first terminal, and thereby executing the first function and the second function with the third terminal by establishing a wireless communication with the third terminal.

11. A method of sharing a screen in real-time during a chat between terminals, the method comprising:
    transmitting, by a first terminal to a second terminal, a message requesting a real-time screen sharing and chatting while performing a chat with the second terminal;
    receiving, by the first terminal from the second terminal, a response message accepting the request for the real-time screen sharing and chatting when the second terminal is available for the real-time screen sharing and chatting; and
    sharing, by the first terminal, an image displayed on a screen of the first terminal with the second terminal in real-time, and translucently displaying a chat window that overlaps the shared image and thereby displays a chat content.

12. The method of claim 11, further comprising:
    displaying, by the first terminal, an output message indicating start of the real-time screen sharing and chatting in response to receiving the response message.

13. The method of claim 11, further comprising:
    displaying, by the first terminal, a chat window control icon on the screen of the first terminal,
    wherein the chat window is displayed on or removed from the screen of the first terminal in response to a touch input on the chat window control icon.

14. The method of claim 11, further comprising:
    displaying a menu of the real-time screen sharing and chatting,
    wherein the menu comprises at least one of a moving picture sharing function, a news sharing function, a music sharing function, a map sharing function, a photo/image sharing function, and a handwriting-on-screen function.

15. The method of claim 11, further comprising:
    displaying a menu of the real-time screen sharing and chatting,
    wherein the menu comprises at least one of a function of immediately executing a registered application, a function of capturing the screen of the first terminal and saving the captured screen in an image file format, and a function of controlling a transparency of the chat window.

16. The method of claim 11, further comprising:
displaying a menu of the real-time screen sharing and chatting,
wherein the menu comprises a function of pausing the real-time screen sharing and chatting or a function of resuming the paused real-time screen sharing and chatting.

17. The method of claim 11, wherein the first terminal shares audio or sound output from the first terminal or input to the first terminal with the second terminal in real-time.

18. A method of sharing a screen in real-time during a chat between terminals, the method comprising:
transmitting, by a first terminal to a second terminal, a message requesting a real-time screen sharing and chatting while sharing an image displayed on a screen of the first terminal with the second terminal in real-time;
receiving, by the first terminal from the second terminal, a response message accepting the request for the real-time screen sharing and chatting when the second terminal is available for the real-time screen sharing and chatting; and
translucently displaying, by the first terminal, a chat window that overlaps the shared image and thereby displays a chat content.

19. The method of claim 18, further comprising:
displaying, by the first terminal, an output message indicating start of the real-time screen sharing and chatting in response to receiving the response message.

20. A method of sharing a screen in real-time during a chat between terminals, the method comprising:
receiving, by a second terminal from a first terminal, a message requesting a real-time screen sharing and chatting while performing a chat with the first terminal;
displaying, by the second terminal, an output message indicating a query as to whether to accept the request for the real-time screen sharing and chatting when the second terminal is available for the real-time screen sharing and chatting;
transmitting, by the second terminal to the first terminal, a response message accepting the request for the real-time screen sharing and chatting in response to receiving an acceptance on the request for the real-time screen sharing and chatting; and
sharing, by the second terminal, and thereby outputting an image displayed on a screen of the first terminal, and translucently displaying a chat window that overlaps the shared image and thereby displays a chat content.

21. A method of sharing a screen in real-time during a chat between terminals, the method comprising:
receiving, by a second terminal from a first terminal, a message requesting a real-time screen sharing and chatting while sharing and thereby outputting an image displayed on a screen of a first terminal;
displaying, by the second terminal, an output message indicating a query as to whether to accept the request for the real-time screen sharing and chatting when the second terminal is available for the real-time screen sharing and chatting;
transmitting, by the second terminal to the first terminal, a response message accepting the request for the real-time screen sharing and chatting in response to receiving an acceptance on the request for the real-time screen sharing and chatting; and
translucently displaying, by the second terminal, a chat window that overlaps the shared image and thereby displays a chat content.

22. A terminal comprising:
an output unit configured to output information on a screen;
a transceiver configured to transmit a message requesting a real-time screen sharing and chatting during a chat between the terminal and a second terminal; and
a controller configured to share, with the second terminal in real-time, an image displayed on a screen through the output unit and to translucently display a chat window that overlaps the shared image and thereby displays a chat content, in response to receiving a response message accepting the request for the real-time screen sharing and chatting from the second terminal through the transceiver.

23. The terminal of claim 22, wherein the controller is configured to display, through the output unit, an output message indicating start of the real-time screen sharing and chatting in response to receiving the response message.

24. A terminal comprising:
an output unit configured to output information on a screen;
a transceiver configured to transmit, to a second terminal, a message requesting a real-time screen sharing and chatting while sharing, with the second terminal in real-time, an image displayed on a screen through the output unit; and
a controller configured to translucently display a chat window that overlaps the shared image and thereby displays a chat content, in response to receiving a response message accepting the request for the real-time screen sharing and chatting from the second terminal through the transceiver.

25. The terminal of claim 24, wherein the controller is configured to display, through the output unit, an output message indicating start of the real-time screen sharing and chatting in response to receiving the response message.

26. A terminal comprising:
a transceiver configured to receive, from a first terminal, a message requesting a real-time screen sharing and chatting during a chat between the terminal and the first terminal;
an output unit configured to display an output message indicating a query as to whether to accept the request for the real-time screen sharing and chatting when the terminal is available for the real-time screen sharing; and
a controller configured to transmit, to the first terminal, a response message accepting the request for the real-time screen sharing and chatting through the transceiver in response to receiving an acceptance on the request for the real-time screen sharing and chatting, to share and thereby output an image displayed on a screen of the first terminal through the output unit in real-time, and to translucently display a chat window that overlaps the shared image and thereby displays a chat content.

27. A terminal comprising:
a transceiver configured to receive, from a first terminal, a message requesting a real-time screen sharing and chatting while sharing and thereby outputting an image displayed on a screen of the first terminal;
an output unit configured to display an output message indicating a query as to whether to accept the request for the real-time screen sharing and chatting when the terminal is available for the real-time screen sharing and chatting; and
a controller configured to transmit, to the first terminal, a response message accepting the request for the real-time screen sharing and chatting through the transceiver in response to receiving an acceptance on the request for the real-time screen sharing and chatting, and to translucently display a chat window that overlaps the shared image and thereby displays a chat content.

28. A method of sharing a screen between terminals, the method comprising:
- executing a screen sharing function of a first terminal to share a screen of the first terminal with a second terminal;
- detecting a new call received at the first terminal while the screen sharing function of the first terminal is being executed; and
- pausing the screen sharing function based on a function corresponding to the new call among a plurality of functions.

29. The method of claim 28, wherein the executing comprises providing an interface associated with the plurality of functions in response to detecting a gesture of a user on a displayed icon,
- wherein the method further comprises:
- resuming the paused screen sharing function in response to the gesture of the user on the displayed icon detected while pausing the screen sharing function.

30. The method of claim 28, wherein the pausing comprises checking a function setting table indicating settings of a user with respect to the plurality of functions, in response to detecting the new call.

31. The method of claim 28, wherein the pausing comprises pausing a sound sharing function together with the screen sharing function when the new call is a call for a voice call or a video call.

32. The method of claim 28, wherein a graphic effect of a screen displayed on the second terminal is changed in response to pausing the screen sharing function of the first terminal.

33. A method of sharing a function, the method comprising:
- receiving a function sharing request in order to commonly execute at least two functions among a plurality of users;
- determining whether the at least two functions include a voice call function or a video call function in response to the function sharing request; and
- displaying an acceptance confirm message inquiring about whether to accept the function sharing request based on whether the at least two functions include the voice call function or the video call function.

34. The method of claim 33, wherein the displaying comprises initially displaying an acceptance confirm message inquiring about whether to share the voice call function or the video call function and then, displaying an acceptance confirm message inquiring about whether to accept a request for sharing a function excluding the voice call function or the video call function from among the at least two functions when the voice call function or the video call function is accepted.

35. The method of claim 33, further comprising:
- refusing the function sharing request without inquiring about whether to accept the request for sharing the function excluding the voice call function or the video call function from among the at least two functions when the voice call function or the video call function is refused.

* * * * *